(12) United States Patent
Murofushi et al.

(10) Patent No.: US 12,530,559 B2
(45) Date of Patent: Jan. 20, 2026

(54) READING DEVICE

(71) Applicant: CANON KABUSHIKI KAISHA, Tokyo (JP)

(72) Inventors: Mitsuhide Murofushi, Shizuoka (JP); Kenichi Nakao, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/822,767

(22) Filed: Sep. 3, 2024

(65) Prior Publication Data

US 2024/0428041 A1 Dec. 26, 2024

Related U.S. Application Data

(63) Continuation of application No. PCT/JP2023/001360, filed on Jan. 18, 2023.

(30) Foreign Application Priority Data

Mar. 17, 2022 (JP) ................................ 2022-042058
Apr. 18, 2022 (JP) ................................ 2022-068066

(51) Int. Cl.
*G06K 19/077* (2006.01)
*G06K 19/07* (2006.01)

(52) U.S. Cl.
CPC ... *G06K 19/07773* (2013.01); *G06K 19/0702* (2013.01); *G06K 19/0723* (2013.01)

(58) Field of Classification Search
CPC ......... G06K 19/07773; G06K 19/0702; G06K 19/0723

USPC ........................................................ 235/492
See application file for complete search history.

(56) References Cited

U.S. PATENT DOCUMENTS

| | | | |
|---|---|---|---|
| 8,830,703 B2 | 9/2014 | Murofushi | |
| 10,277,764 B2 | 4/2019 | Kobayashi | |
| 10,944,327 B2 | 3/2021 | Murofushi | |
| 12,067,442 B2 | 8/2024 | Murofushi | |
| 2016/0173171 A1* | 6/2016 | Tailliet | G06K 19/07769 455/41.1 |

(Continued)

FOREIGN PATENT DOCUMENTS

| | | |
|---|---|---|
| JP | 2007-88661 A | 4/2007 |
| JP | 2013-162195 A | 8/2013 |

(Continued)

*Primary Examiner* — Allyson N Trail
(74) *Attorney, Agent, or Firm* — VENABLE LLP

(57) ABSTRACT

A reading device includes an antenna element, a substrate including a communication circuit and a ground plane, a connecting member protruding from the substrate in a thickness direction of the substrate and configured to electrically connect the communication circuit and the antenna element, and a casing configured to retain the antenna element, the substrate, and the connecting member. The antenna element is arranged separately from the substrate toward one side in the thickness direction. The casing includes a first surface portion that covers the substrate when viewed from the other side in the thickness direction. In a case where a distance in the thickness direction from a feed point to the ground plane is a first distance, and a distance in the thickness direction between the substrate and the first surface portion is a second distance, the first distance is greater than the second distance.

14 Claims, 18 Drawing Sheets

(56) References Cited

U.S. PATENT DOCUMENTS

| | | |
|---|---|---|
| 2024/0062597 A1 | 2/2024 | Fujii |
| 2024/0176964 A1 | 5/2024 | Murofushi |
| 2024/0428041 A1* | 12/2024 | Murofushi ......... G06K 19/0702 |
| 2025/0094748 A1* | 3/2025 | Tanaka ............... G06K 7/10881 |

FOREIGN PATENT DOCUMENTS

| | | |
|---|---|---|
| JP | 2015-60442 A | 3/2015 |
| JP | 2016-206958 A | 12/2016 |

\* cited by examiner

A-A

READING DEVICE

CROSS-REFERENCE TO RELATED APPLICATIONS

This application is a Continuation of International Patent Application No. PCT/JP2023/001360, filed Jan. 18, 2023, which claims the benefit of Japanese Patent Application Nos. 2022-042058, filed Mar. 17, 2022, and 2022-068066, filed Apr. 18, 2022, all of which are hereby incorporated by reference herein in their entirety.

BACKGROUND OF THE INVENTION

Field of the Invention

The present invention relates to a reading device that performs wireless communication with a wireless device.

Description of the Related Art

Heretofore, there is known a reading device so-called a radio frequency identification (RFID) reader that is used to read information from a wireless device such as an RFID tag attached to a management target, such as a person or an object, through wireless communication. Japanese Patent Application Laid-Open Publication No. 2015-060442 discloses a handy-type RFID reader that is held by a user when used, wherein a coaxial cable that connects an RFID substrate and an antenna is arranged such that a portion thereof is disposed along a main substrate. According to Japanese Patent Application Laid-Open Publication No. 2015-060442, a ground of the main substrate is used as a virtual ground of the antenna, according to which a gain of the antenna in a longitudinal direction of the main substrate may be enhanced.

A reading device that carries out wireless communication a wireless device such as an RFID tag may have a thin plate-like outer shape according to a purpose of use. In that case, it was necessary to suppress increase in size of the apparatus in a thickness direction while realizing a high gain of the antenna.

SUMMARY OF THE INVENTION

According to an aspect of the invention, a reading device includes an antenna element, a substrate including a communication circuit configured to perform transmission and reception of radio signals with an RFID tag via the antenna element, and a ground plane configured to provide a reference potential of the antenna element, a connecting member protruding from the substrate in a thickness direction of the substrate and configured to electrically connect the communication circuit and the antenna element, and a casing configured to retain the antenna element, the substrate, and the connecting member, the casing having a plate-like outer shape whose dimension in the thickness direction is smaller than dimensions in a height direction and a width direction when viewed in the thickness direction, wherein the antenna element is arranged separately from the substrate toward one side in the thickness direction, wherein the casing includes a first surface portion that covers the substrate when viewed from the other side in the thickness direction, and wherein in a case where a distance in the thickness direction from a feed point at which the connecting member comes into contact with the antenna element to the ground plane is a first distance, and a distance in the thickness direction between the substrate and the first surface portion is a second distance, the first distance is greater than the second distance.

According to another aspect of the invention, a reading device includes an antenna element, a substrate including a communication circuit configured to perform transmission and reception of radio signals with an RFID tag via the antenna element, a connecting member protruding from the substrate in a thickness direction of the substrate and configured to electrically connect the communication circuit and the antenna element, a casing configured to retain the antenna element, the substrate, and the connecting member, a control portion configured to control the communication circuit, a battery, and a power supply portion configured to feed a power from the battery to the communication circuit and the control portion, wherein in a horizontal direction horizontal to a surface of the substrate on which the communication circuit is provided, a distance between a feed point at which the connecting member comes into contact with the antenna element and the communication circuit is shorter than a distance between the feed point and the control portion.

Further features of the present invention will become apparent from the following description of exemplary embodiments with reference to the attached drawings.

DESCRIPTION OF THE EMBODIMENTS

Embodiments according to the present disclosure will be described below with reference to the drawings.

In the following description, a thickness direction of an RFID reader 100 is referred to as an X-axis direction. Directions that are each orthogonal to the X-axis direction and that are also orthogonal to each other are referred to as a Y-axis direction and a Z-axis direction. In the embodiment described below, the RFID reader 100 has an outer shape that is a thin plate-like shape, i.e., tablet shape, whose dimension, i.e., thickness, in the X-axis direction is smaller than a height and a width viewed in the X-axis direction. The outer shape of the RFID reader 100 is a rectangular shape in which, when viewed in the thickness direction, the Z-axis direction serves as a height direction, i.e., long side direction, or up-down direction, and the Y-axis direction serves as a width direction, i.e. short side direction, or right-left direction. The outer shapes and the components of the RFID reader 100 are not limited to those illustrated below, and are modified arbitrarily according to the purpose of use. In the specific configurations of the RFID reader 100, the direction of an axial direction corresponding to an in-plane direction perpendicular to the thickness direction, i.e., X-axis direction, may be varied.

A side on which a switch 131 described below is arranged with respect to the X-axis direction, i.e., +X side, is referred to as a front side of the RFID reader 100, and an opposite side thereof, i.e., −X side, is referred to as a rear side of the RFID reader 100. A side on which an LED 130 described below is arranged with respect to the Z-axis direction, i.e., +Z side, is referred to as an upper side of the RFID reader 100, and an opposite side thereof, i.e., −Z side, is referred to as a lower side or bottom side of the RFID reader 100. Further, in a state where an upper side surface of the RFID reader 100 faces an upper side in a vertical direction, i.e., gravity direction, a right side, i.e., +Y side, when the RFID reader 100 is viewed from the front side is referred to a right side of the RFID reader 100, and an opposite side thereof, i.e., −Y side, is referred to as a left side of the RFID reader 100.

Further, an "RFID reader" is defined to include an RFID reader-writer having both a function to read information from a wireless device, such as an RFID tag, and a function to write information into the wireless device.

1. First Embodiment

1.1. Basic Configuration of RFID Reader

Figure 1:
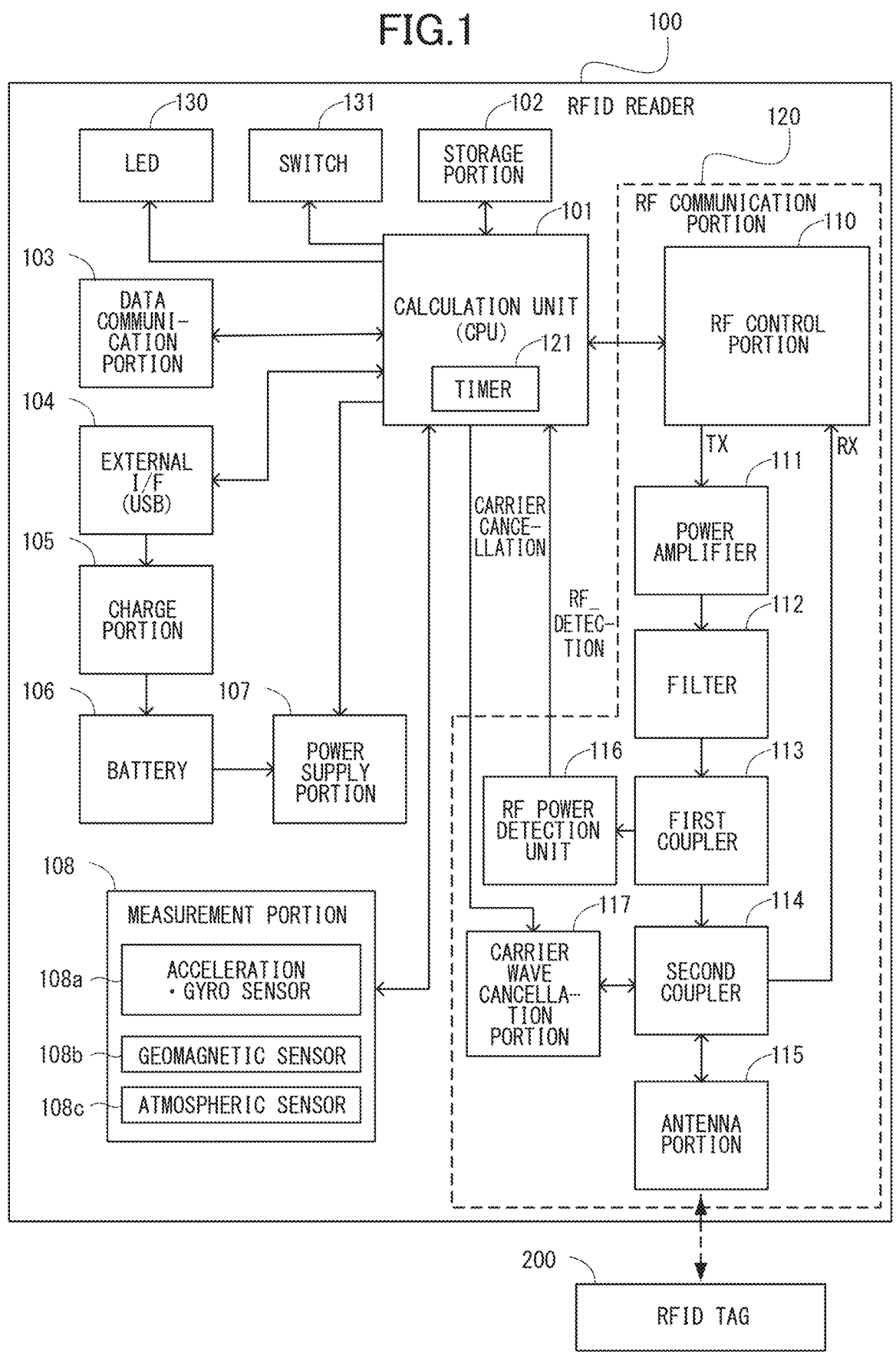
FIG. 1 is a block diagram illustrating a configuration of an RFID reader according to a first embodiment.

First, components and functions of the RFID reader 100 serving as a reading device according to a first embodiment will be described with reference to FIG. 1. FIG. 1 is a block diagram illustrating an electrical configuration of the RFID reader 100.

As illustrated in FIG. 1, the RFID reader 100 includes an antenna portion 115, and an RF communication portion 120 that performs wireless communication via the antenna portion 115 with a wireless device such as an RFID tag 200. Further, the RFID reader 100 includes a calculation unit 101, a storage portion 102, a data communication portion 103, an external interface (I/F) 104, a charge portion 105, a battery 106, a power supply portion 107, a measurement portion 108, the LED 130, and the switch 131.

The antenna portion 115 and the RF communication portion 120 constitute a detection unit, i.e., reading unit or communication unit, that detects the RFID tag 200 and reads information from the RFID tag 200. The RFID reader 100 emits an electromagnetic wave from the antenna portion 115. The RF communication portion 120 is a communication circuit disposed on a substrate 150 described below that performs transmission and reception of radio signals through the antenna portion 115.

The RFID tag 200 is a passive tag in which a small IC chip, a memory, and an antenna are disposed, storing identification information for identifying the tag and other information in the memory. The IC chip within the RFID tag 200 operates using the energy of the electromagnetic wave emitted from the RFID reader 100, and transmits, i.e., returns, the ID information on a reflected wave of the electromagnetic wave emitted from the RFID reader 100. The RFID reader 100 can read the ID information from the RFID tag 200 by detecting the electromagnetic wave from the RFID tag 200 via the antenna portion 115.

The frequency of the electromagnetic wave used for the communication between the RFID reader 100 and the RFID tag 200 is not specifically limited, but for example, a radio wave of the UHF band is used. The RFID reader 100 and the RFID tag 200 may communicate within a reading range, i.e., a distance of a few meters.

The calculation unit 101 and the storage portion 102 function as a control portion, i.e., controller, for controlling the operation of the RFID reader 100. The calculation unit 101 is, for example, a Central Processing Unit (CPU). The storage portion 102 includes a Read Only Memory (ROM) serving as a nonvolatile memory, and a Random Access Memory (RAM) serving as a volatile memory. The ROM stores programs for defining operation procedures of the RFID reader 100 and data collected by the RFID reader 100.

By executing the program read from the ROM and using the RAM as work space, the calculation unit 101 controls the operation of the respective units of the RFID reader 100. For example, the calculation unit 101 causes the RF communication portion 120 to execute reading of the RFID tag within the reading range and causes the read information and a reading time to be stored as reading result data in the storage portion 102. Further, in parallel with the reading of the RFID tag, the calculation unit 101 measures a moving amount of the RFID reader 100 based on a measurement result of the measurement portion 108, and stores the measured moving amount and a time of measurement as measurement result data in the storage portion 102. Then, the calculation unit 101 sends the reading result data and the measurement result data stored in the storage portion 102 together with the identification information of its own device via the data communication portion 103 to a management server. Further, it may be possible to use a one-chip microcomputer in which the calculation unit 101 and the storage portion 102 are integrated.

By storing data temporarily in the storage portion 102 and transmitting the data at a suitable timing via the data communication portion 103 to an external apparatus, the frequency of communication of the RFID reader 100 with an external apparatus may be suppressed, and power consumption of the RFID reader 100 may be reduced. Further, even in a case where the RFID reader 100 may not communicate with an external apparatus, information may be stored temporarily in the storage portion 102.

The calculation unit 101 includes a timer 121 for setting an operation period of the RFID reader 100. The timer 121 may perform an operation to count a plurality of time periods in parallel as a timer for keeping time and a timer for determining the elapse of a predetermined period of time.

The measurement portion 108 may measure a relative moving amount of the RFID reader 100 and a data of an environment in which the RFID reader 100 is placed, and may output the measured data to the calculation unit 101. The measurement portion 108 according to the present embodiment includes an acceleration-gyro sensor 108a, a geomagnetic sensor 108b, and an atmospheric sensor 108c. The acceleration-gyro sensor 108a measures the acceleration that is applied to the RFID reader 100 based on a device coordinate system specific to the RFID reader 100, and outputs an acceleration data. Further, the acceleration-gyro sensor 108a measures an angular velocity of the RFID reader 100, that is, change of position of the RFID reader 100, and outputs an angular velocity data. The geomagnetic sensor 108b measures an orientation of the RFID reader 100 in real space, and outputs an orientation data. The atmospheric sensor 108c measures an atmospheric pressure of the space in which the RFID reader 100 is placed, and outputs an atmospheric pressure data.

The measurement portion 108 may measure the relative moving amount of the RFID reader 100 by converting the direction of acceleration of the RFID reader 100 to a direction in a real space coordinate system and accumulating the acceleration based on the data from the sensor. The measurement of the moving amount may be performed according to an arbitrary and known self-position estimation method. A relative moving amount being output from the measurement portion 108 to the calculation unit 101 may be a two-dimensional vector within a plane parallel to a horizontal plane, i.e., floor surface, of a target area, or it may be a three-dimensional vector that also includes a height-direction component. A reference position of measurement of the relative moving amount may be, for example, a position of the RFID reader 100 at a point of time when the RFID reader 100 has been activated.

FIG. 1 illustrates an example in which the RFID reader 100 includes the measurement portion 108, but the measurement portion 108 may be included in an external device held by the user together with the RFID reader 100 and that is capable of communicating with the RFID reader 100. In that case, the RFID reader 100 receives a moving amount information that indicates the relative moving amount measured by the measurement portion 108 from the external device.

The type of sensor arranged in the measurement portion 108 may be varied according to the purpose of use of the RFID reader 100. Further, in a case where the RFID reader 100 is used in a state fixed to a predetermined position in the real space, it may be possible to adopt a configuration where the RFID reader 100 does not include the measurement portion 108.

The RF communication portion 120 is an electronic circuit that is controlled by the calculation unit 101, and that performs transmission and reception of electromagnetic waves with the RFID tag 200 via the antenna portion 115. The RF communication portion 120 includes an RF control portion 110, a power amplifier 111, a filter 112, a first coupler 113, a second coupler 114, an RF power detection unit 116, and a carrier wave cancellation portion 117.

The RF control portion 110 outputs a transmission signal, such as a signal modulated in the UHF band, from a TX terminal to the power amplifier 111 based on an instruction from the calculation unit 101. The power amplifier 111 amplifies the transmission signal entered from the RF control portion 110, and outputs the same to the filter 112. The filter 112 removes an unnecessary low frequency component from the transmission signal after it has been amplified by the power amplifier 111. The power of the RF output may be varied according to the instruction from the calculation unit 101.

The first coupler 113 distributes the transmission signal having passed through the filter 112 to a coupler 114 and a power detection unit 116. The second coupler 114 outputs the transmission signal being entered from the first coupler 113 to the antenna portion 115, and outputs the reception signal entered from the antenna portion 115 to the RF control portion 110. It is also possible to use a circulator instead of the second coupler 114, and to separate a path through which the transmission signal is sent from the first coupler 113 to the antenna portion 115 and through which the reception signal received by the antenna portion 115 is sent to the RF control portion 110.

The antenna portion 115 includes at least one antenna element. The antenna portion 115 radiates the transmission signal entered from the second coupler 114 as an electromagnetic wave to the circumference of the RFID reader 100. Further, the antenna portion 115 receives a signal returned from the RFID tag 200 and outputs a reception signal to the second coupler 114.

The power detection unit 116 detects a power level of the signal entered from the first coupler 113, and outputs a signal (RF_Detection) indicating the detected power level to the calculation unit 101. The carrier wave cancellation portion 117 cancels the carrier wave component in the reception signal received by the antenna portion 115 via the second coupler 114 (Carrier Cancellation), based on the signal received from the calculation unit 101. Thereby, a desired signal component of the reception signal is entered via an RX terminal to the RF control portion 110. The RF control portion 110 demodulates the signal entered from the RX terminal to acquire the ID information and other information returned from the RFID tag 200, and outputs the acquired information to the calculation unit 101.

The data communication portion 103 is a connecting unit, i.e., external communication portion, for connecting the RFID reader 100 in a communicatable manner with an external device, i.e., a target that differs from the RFID tag 200. The data communication portion 103 is a wireless module portion that may perform a Bluetooth (Registered Trademark) communication, and it may be a wireless module that performs Wi-Fi communication. Further, the data communication portion 103 may be a Wireless Local Area Network (WLAN) interface that communicates with an WLAN access, or a cellular communication interface that communicates with a cellular base station. Further, the data communication portion 103 may be a connection interface for connecting with a relay device, such as a terminal owned by the user.

The external I/F 104 is a communication interface for realizing wired connection of the RFID reader 100 with the external device. The RFID reader 100 may perform firmware update by communication via an external I/F. Further, the external I/F 104 according to the present embodiment also functions as an interface that is connected with a power supply line for receiving power supply for charging the battery 106. The external I/F 104 may be, for example, a Universal Serial Bus (USB) connector, or USB port.

The charge portion 105 is a circuit for charging the battery 106. The charge portion 105 includes a charging IC, i.e., charge control IC, for controlling the voltage and current supplied to the battery 106 while monitoring the state of the battery 106. The charge portion 105 charges the battery 106 using the power supplied from an exterior via the external I/F 104.

The battery 106 is a chargeable and reusable secondary battery, such as a lithium-ion battery. The power supply portion 107 includes a DC-DC converter, and it is a circuit that receives power supply from the battery 106 and supplies power supply voltage to respective components of the RFID reader 100.

The Light Emitting Diode (LED) 130 is a display unit for notifying the state of the RFID reader 100 to the exterior. Turning on and off of the LED 130 is controlled by the calculation unit 101. A multicolor LED chip having a plurality of LEDs and capable of emitting multiple colors may also be used. For example, the LED 130 may emit green light during use, emit amber light during charging, and be turned off when power is turned off.

The switch 131 is an operation portion for switching the operation status of the RFID reader 100 from the exterior. The switch 131 is a tact switch that is operated when a button (131B) described below is pressed by a user. For example, the user may turn the power of the RFID reader 100 on and off by holding down the switch 131, and may reset the firmware by pressing the switch 131 longer. In addition, it may be possible to enable the user to instruct the RFID reader 100 to start or stop reading the RFID tag 200 or for transiting to an energy-saving mode by pressing the switch 131.

The calculation unit 101 interprets the contents of operation of the user based on the current operation status of the RFID reader 100 and the operation method of the switch 131, including the length of holding time and the number of times of the pressing operation. However, the operation status of the RFID reader 100 is not limited thereto. Further, in addition to the switch 131 or instead of the switch 131, there may be an operation portion for allowing the user to operate the RFID reader 100.

1.2. Example of Use of RFID Reader

The RFID reader 100 may constitute an RFID system capable of determining the position of a target existing within a real space based on a result of reading of identification information from RFID tags arranged in a dispersed manner at multiple positions. The target of position determination may be the RFID tag itself, or a person, an animal, or an object having the RFID tag attached thereto, an RFID reader for reading the identification information, a user who holds the RFID reader, or a machine equipped with the RFID reader.

Figure 2A:
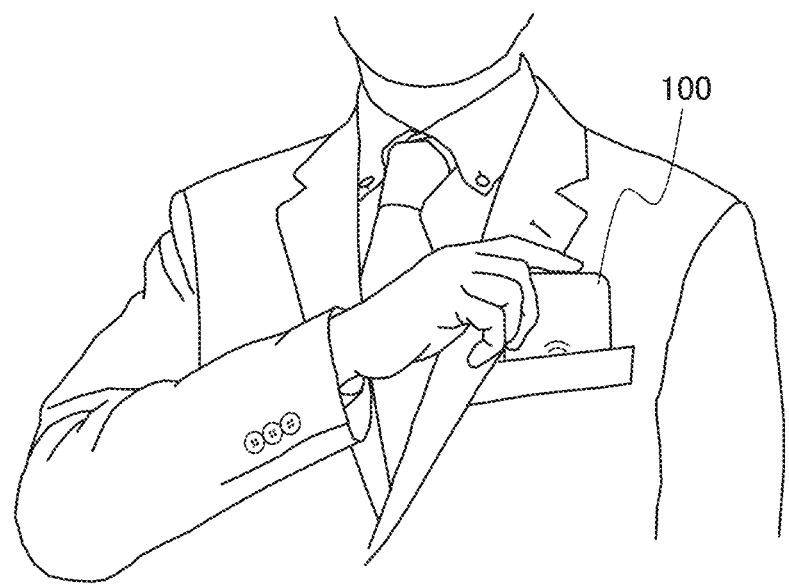
FIG. 2A is an explanatory view illustrating an example of use of the RFID reader according to the first embodiment.
Figure 2B:
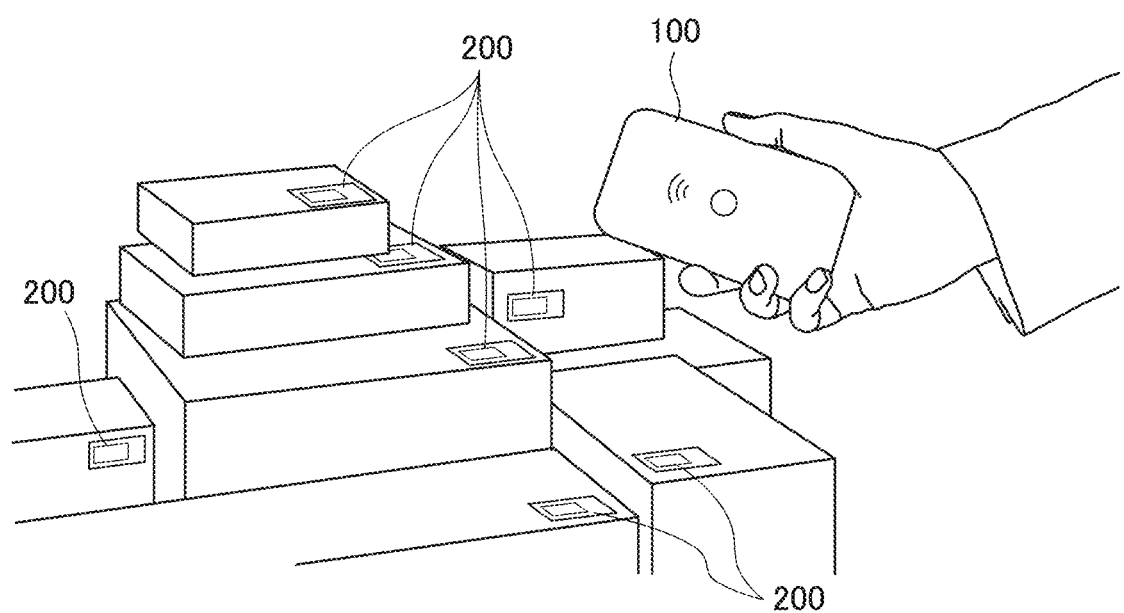
FIG. 2B is an explanatory view illustrating an example of use of the RFID reader according to the first embodiment.

An example of use of the RFID reader 100 is illustrated in FIGS. 2A and 2B. As illustrated in FIG. 2A, in this example, the user carries the RFID reader 100 in a pocket of his/her clothes. As illustrated in FIG. 2B, the RFID tag 200, hereinafter referred to as an article tag, is attached to each management target, which in this example is the article. Further, the RFID tags 200, i.e., position tags or reference tags, serving as a reference of position information, are arranged at specific positions within a building.

The RFID reader 100 calculates a moving amount from a point of time when the position tag has been detected based on the measurement result of the measurement portion 108 to grasp a current position of the reader as relative position with respect to the position tag. Further, the RFID reader 100 may acquire the position information of a plurality of articles dispersed within the real space by associating the current position at the point of time when the article tag has been detected and the ID information of the relevant article tag.

The RFID reader 100 may provide the position information of the article to an external information processing apparatus via the data communication portion 103. Further, it may be possible to install a display unit such as a liquid crystal panel to the RFID reader 100 itself, and to display the position information of an article acquired by the reader or other readers connected in a communicatable manner with the reader.

The example illustrated in FIGS. 2A and 2B is one example, and the configuration of the RFID system capable of adopting the RFID reader 100, i.e. reading device, is not limited thereto. For example, instead of a configuration in which the user carries the RFID reader 100, the RFID reader 100 may be installed in a movable machine, such as a drone, a vehicle, or a robot. Further, a system may be configured in which the RFID reader 100 is fixed in a predetermined position within the real space and the RFID tag 200 attached to the management target is detected thereby, so that the position of the management target moving within the real space may be recognized.

The RFID tag 200 is an example of a wireless device capable of having the information read by the RFID reader 100. The wireless device may be an active-type RFID tag. In a case where power from a battery installed within the wireless device itself is used to actively, for example periodically, transmit information to the circumference, the device may be referred to as a beacon tag. The wireless device may be called by other names, such as an IC tag, an IC card, or a responder. Further, the information that the RFID reader 100 reads from the wireless device is not limited to ID information, and may be other types of information.

1.3. Two-Dimensional Arrangement of Components

According to the present embodiment, most of the components of the RFID reader 100 illustrated in FIG. 1 are arranged on one substrate. The outer shape and the arrangement of main components of the substrate 150 of the RFID reader 100 will be described with reference to FIGS. 3 to 5.

Figure 3:
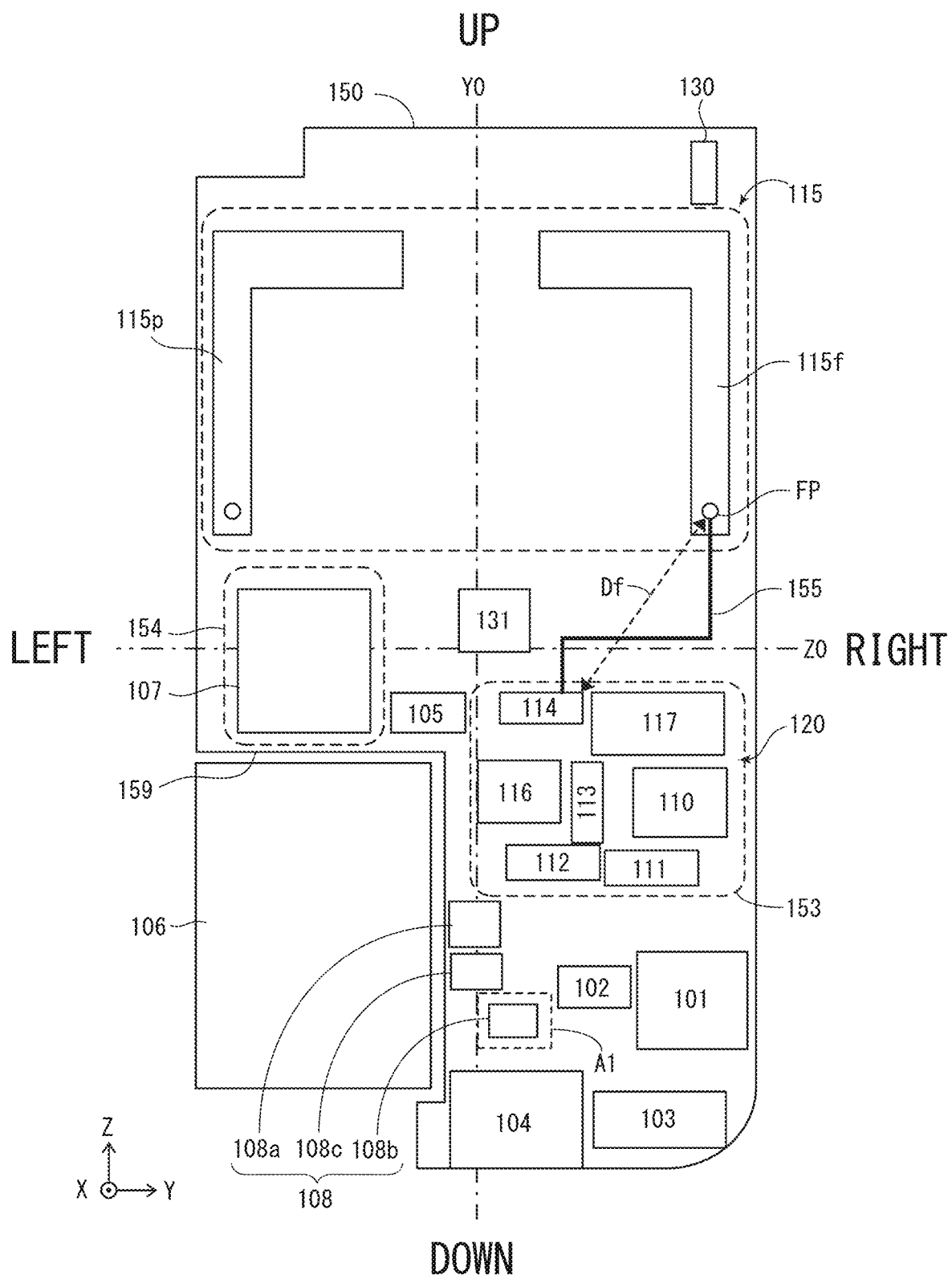
FIG. 3 is an arrangement plan view illustrating an arrangement of main components of the RFID reader according to the first embodiment.
Figure 4:
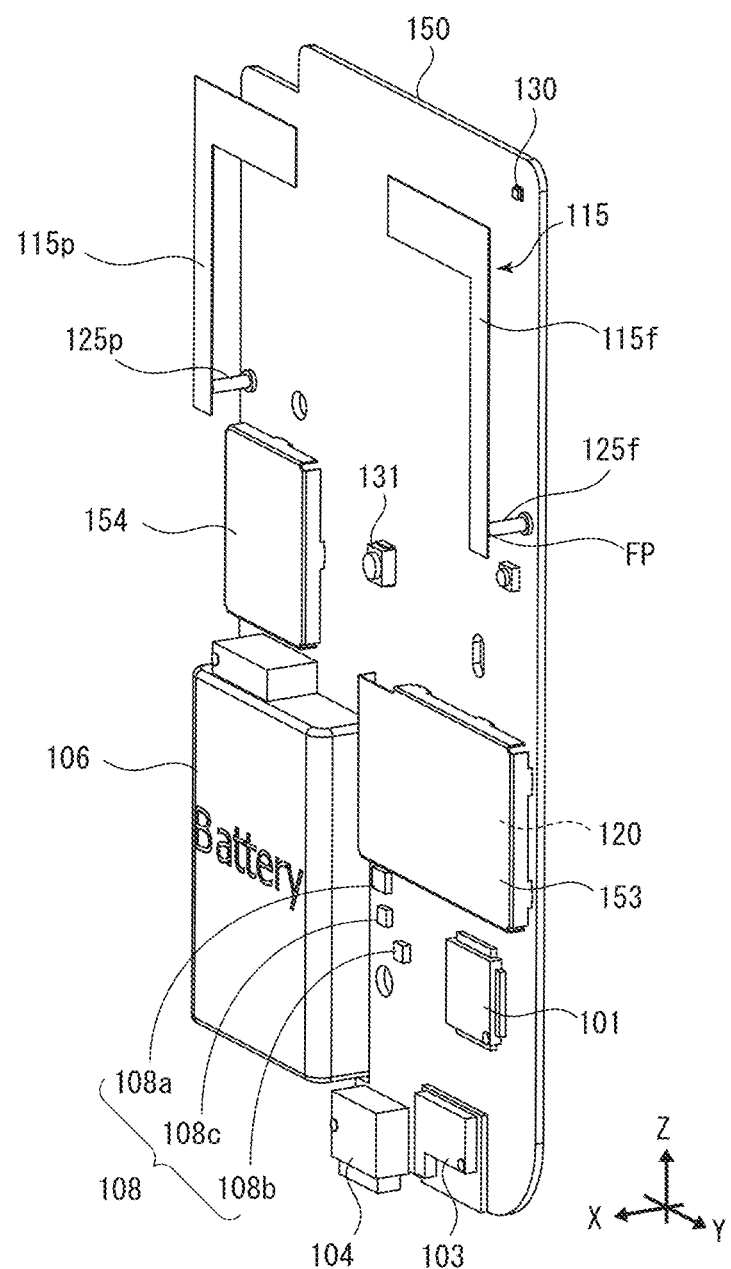
FIG. 4 is a perspective view of main components of the RFID reader according to the first embodiment.
Figure 5:
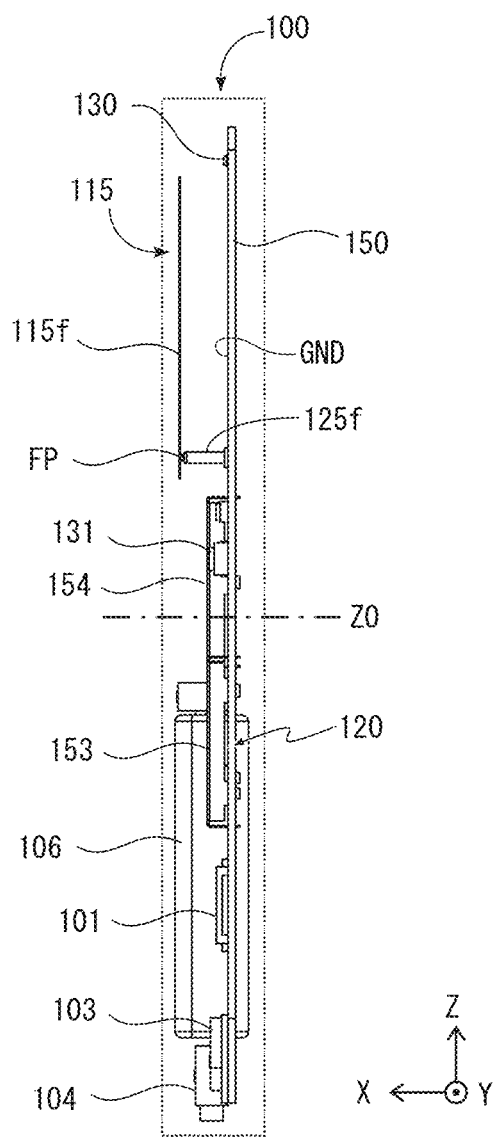
FIG. 5 is a side view of main components of the RFID reader according to the first embodiment.

FIG. 3 is an arrangement plan view illustrating the arrangement of main components of the RFID reader 100, and illustrates a view of the substrate 150 taken from a front side, i.e., +X side, in the thickness direction of the RFID reader 100. FIG. 4 is a perspective view of the main components of the RFID reader 100. FIG. 5 is side view illustrating the main components of the RFID reader 100 taken from the right side, i.e., +Y side.

As illustrated in FIG. 3, the substrate 150 has an approximately rectangular-shaped outer shape in which the up-down direction, i.e. Z-axis direction, corresponds to the long side direction and the right-left direction, i.e., Y-axis direction, corresponds to the short side direction. In FIG. 3, a center position of the substrate 150 in the up-down direction is denoted by Z0, and a center position of the substrate 150 in the right-left direction is denoted by Y0.

As illustrated in FIGS. 3 and 4, the LED 130 is arranged near an upper end of the substrate 150. As described below, a light guide 130g (FIGS. 8A, 8D and 8F) that emits the light generated by the LED 130 to the exterior is exposed to the outer portion of a casing 160 at a front side portion 160F and an edge portion of an upper side portion 160U of the casing 160 of the RFID reader 100. Therefore, it is preferable that the LED 130 is arranged near the exposed portion of the light guide 130g.

The antenna portion 115 according to the present embodiment performs transmission and reception of radio waves composed of an active antenna element 115f and a parasitic antenna element 115p. A phosphor bronze serving as base material having an Ni/Au plating coated on a surface thereof to provide an anticorrosion effect and an effect to reduce contact resistance may be used as the respective antenna elements. The respective antenna elements may be attached to an inner side of the casing 160 by double-sided tape.

The active antenna element 115f is connected to the RF communication portion 120 on the substrate 150 via a contact pin 125f serving as a connecting member, a passive element, not shown, such as a capacitor, an inductor, and a resistor connected to the contact pin 125f, and a feed line 155 composed of a conductor pattern formed on the substrate 150. The contact pin 125f and the feed line 155 constitute a transmission line for transmitting signals between the active antenna element 115f and the RF communication portion 120. The active antenna element 115f is a feed element that receives power supply from the RF communication portion 120 and emits electromagnetic waves.

The parasitic antenna element 115p is connected to a ground plane of the substrate 150 via a contact pin 125p and a passive element, not shown, such as a capacitor, an inductor, and a resistor connected to the contact pin 125p. The parasitic antenna element 115p is a parasitic element that radiates an electromagnetic wave together with the active antenna element 115f by resonating with the electromagnetic wave radiated by the active antenna element 115f without receiving direct power supply from the RF communication portion 120. Further, the active antenna element 115f and the parasitic antenna element 115p both function as a receiving antenna. The contact pin 125f and the contact pin 125p are connected via a passive element such as a capacitor, an inductor, and a resistor to the feed line 155 or the ground plane of the substrate 150.

The substrate 150 includes a ground plane, i.e., GND layer. The ground plane is formed as a thin film pattern having conductivity, such as a copper foil. The ground plane provides a reference potential of voltage that is applied to the active antenna element 115f at a feed point FP. The substrate 150 used in the present embodiment is a laminated substrate, and includes multiple layers of ground planes. Reference sign "GND" of FIG. 5 illustrates a ground plane formed on a surface layer of the substrate 150.

Among the ground planes of the substrate 150, mainly the area facing the antenna portion 115, i.e., the area on an upper side of the switch 131 and the power supply portion 107, functions as a part of the antenna. Therefore, it is desirable that electronic components are not arranged near the antenna portion 115.

The antenna portion 115 is preferably composed of a plate-like element that spreads approximately perpendicularly with respect to the X-axis direction, i.e., the thickness direction of the RFID reader 100. The active antenna element 115f and the parasitic antenna element 115p according to the present embodiment respectively spread approximately perpendicularly with respect to the X-axis direction, and they also respectively have a shape that is bent in an L-shape when viewed from the front side in the X-axis direction. In the present embodiment, the active antenna element 115f and the parasitic antenna element 115p have a symmetrical shape in the right and left directions with respect to a center position Y0 of the right-left direction.

According to the present embodiment, the antenna portion 115 is arranged on an upper side of a center position Z0 in the up-down direction of the substrate 150. Further according to the present embodiment, the feed point FP of the active antenna element 115f is disposed at a lower end portion of the active antenna element 115f. Further, a position of contact between the parasitic antenna element 115p and the contact pin 125p described later is also disposed at the lower end portion of the parasitic antenna element 115p. That is, the antenna portion 115 extends upward from the contact portion with the substrate 150.

The illustrated configuration of the antenna portion 115 is merely an example and the shapes and configurations of the antenna elements constituting the antenna portion 115 may be varied according to the required directivity and polarized waves. For example, the active antenna element 115f and/or the parasitic antenna element 115p may be further divided into a plurality of elements, or the antenna portion 115 may be composed of a single antenna element. The antenna element may be a planar antenna having a rectangular shape, or may be a linear antenna such as an inverted F antenna, in X-axis direction view. Further, as described below, the antenna portion 115 according to the present embodiment has a nondirectional and circularly-polarized wave characteristics, but it may also have directional characteristics, or may have linearly-polarized wave characteristics. Further, the antenna portion 115 may be designed to switch the directivity or the polarized wave characteristics.

According to the present embodiment, the components other than the LED 130 of the RFID reader 100 illustrated in FIG. 1 is arranged collectively on a lower side of the antenna portion 115 with respect to the up-down direction. That is, according to the present embodiment, the communication circuit, the external communication portion, the control portion, the power supply portion, and the battery are arranged collectively on one side in the height direction with respect to the antenna element and the parasitic antenna element. According to this arrangement, the conductor pattern that connects the electronic components and the electronic components on the substrate 150 may be arranged away from the vicinity of the antenna portion 115.

The switch 131 is arranged near the center positions Y0 and Z0 in the up-down and right-left directions of the substrate 150. Since the switch 131 is arrange between the two antenna elements in the right-left direction, the antenna characteristics will not be hindered by the arrangement of the switch 131. For example, the shape of the antenna element does not have to be changed to avoid the switch 131 and a button assembly 131B described below. Further, the user may operate the switch 131 easily since the switch 131 is arranged at the center portion of the RFID reader 100.

The RF communication portion 120 is arranged lower than the center position Z0 in the up-down direction of the substrate 150. Further, the occupation range of the RF communication portion 120 in the up-down direction is at least partially overlapped with the occupation range of the battery 106 in the up-down direction. The RF communication portion 120 is arranged on a right side with respect to the battery 106.

That is, the side on which the RF communication portion 120 is arranged with respect to the right-left direction is the same as the side on which the active antenna element 115*f* that receives power supply from the RF communication portion 120 is arranged, i.e., right side, or +Y side. In other words, the antenna element and the parasitic antenna element are arranged in parallel in the width direction, and the communication circuit is arranged on the same side as the antenna element with respect to the width direction. Therefore, the loss of transmission signals or reception signals on the feed line 155 that extends from the RF communication portion 120 to the feed point FP of the active antenna element 115*f* may be reduced. Further, in the actual substrate 150, the feed line 155 does not have to be formed in the path illustrated in FIG. 3, and the path may be designed considering the positional relationship with other electronic components or the relationship between the wavelength of the electromagnetic wave used for transmission and reception with the RFID tag 200.

Further according to the present embodiment, the feed point FP is arranged at the lower end portion of the active antenna element 115*f*, and the element, i.e., the second coupler 114, that is connected with the feed point FP via the feed line 155 within the RF communication portion 120 is arranged at the upper portion of the RF communication portion 120. Thereby, the loss in the feed line 155 may be reduced even further.

The distance, i.e., straight line distance within the YZ plane, from the feed point FP of the active antenna element 115*f* to an element, which according to the present embodiment is the second coupler 114, in the RF communication portion 120 that applies high frequency to the feed point FP via the feed line 155 is referred to as a feed distance Df. The YZ plane is a horizontal direction surface that is horizontal to a surface of the substrate having the communication circuit.

There is a demand to downsize the RFID reader according to the purpose of use. Meanwhile, the RFID reader may include components such as a battery in addition to the RFID substrate or an external communication portion that performs wireless communication with a target that differs from the RFID tag. However, when the RFID reader is downsized, the distance between the respective components is shortened, and there may be a case where increased gain of the antenna cannot be achieved. Therefore, there is a demand to provide a reading device capable of suppressing increase in size of the apparatus and also capable of achieving increased gain of the antenna.

According to the present embodiment, the feed distance Df is shorter than the distance from the feed point FP to the calculation unit 101, i.e., control portion. In other words, in the horizontal direction horizontal to the plane of the substrate including the communication circuit, the distance between the feed point at which the connecting member contacts the antenna element and the communication circuit is shorter than the distance between the feed point and the control portion. Therefore, the influence of the electromagnetic wave noise generated by the calculation unit 101, i.e., control portion, on the transmission and reception of signals through the feed line 155 may be reduced.

Further, the feed distance Df is shorter than the distance from the feed point FP to the data communication portion 103. In other words, the distance in the horizontal direction between the feed point and the communication circuit is shorter than the distance between the feed point and the external communication portion, and the distance between the feed point and the power supply portion. Therefore, the influence that the electromagnetic wave that the data communication portion 103 emits during communication has on the transmission and reception of signals through the feed line 155 may be reduced.

Even further, the feed distance Df is shorter than the distance from the feed point FP to the power supply portion 107. Therefore, the influence that the electromagnetic wave noise generated by the DC-DC converter of the power supply portion 107 has on the transmission and reception of signals through the feed line 155 may be reduced.

As described, according to the present embodiment, the distance DF between the feed point and the communication circuit on the substrate is shorter than any of the distance between the feed point and the control portion, the distance between the feed point and the external communication portion, and the distance between the feed point and the power supply portion.

At least a portion, and preferably the entirety, of the RF communication portion 120 is covered by a shield plate 153. By covering the RF communication portion 120 with the shield plate 153, the reception by the RF communication portion 120 of the electromagnetic wave from the RFID tag 200 or electromagnetic wave noise from outside or within the device, other than through the antenna portion 115, may be reduced. The shield plate 153 is a tin plate, for example, and is attached to the substrate 150 through soldering.

The measurement portion 108 is arranged on a lower side of the RF communication portion 120 and near the center position Y0 of the substrate 150 in the right-left direction. Since the measurement portion 108 is arranged on an opposite side from the antenna portion 115 interposing the RF communication portion 120 in the up-down direction, the possibility of the electromagnetic wave radiated from the antenna portion 115 interfering with various sensor of the measurement portion 108 may be reduced. In other words, since a configuration is adopted where the distance between the feed point and the communication circuit on the substrate is shorter than the distance between the feed point and the measurement portion, the possibility of the electromagnetic wave radiated from the antenna portion 115 interfering with the measurement portion may be reduced.

The geomagnetic sensor 108*b* of the measurement portion 108 is arranged in a non-grounded area A1, i.e., broken line area of FIG. 3, where the ground plane on the substrate 150 is not formed, such that terrestrial magnetism may be detected correctly. Meanwhile, in order to reduce the influence of electromagnetic wave noise from outside the device and to reduce the irradiation of electromagnetic wave noise to the outer side of the device, it is preferable that the ground plane is arranged so as to surround the outer circumference portion of the substrate 150. In the present embodiment, the measurement portion 108 is arranged near the center of right-left direction, and on a lower side of the RF communication portion 120 and an upper side of the storage portion 102 and the external I/F 104 in the up-down direction, it may be possible to arrange the non-grounded area A1 for the sensor to be outside the ground plane on the outer circumference portion of the substrate.

The data communication portion 103 is arranged at the lower end portion of the substrate 150. Since the data communication portion 103 is arranged on an opposite side from the antenna portion 115 in the up-down direction, the interference caused by the electromagnetic wave between the data communication portion 103 and the antenna portion 115 may be reduced.

Figure 8A:
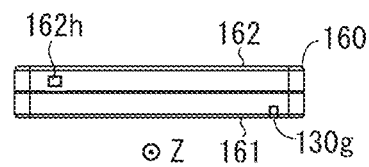
FIG. 8A is a top view of the RFID reader according to the first embodiment.
Figure 8B:
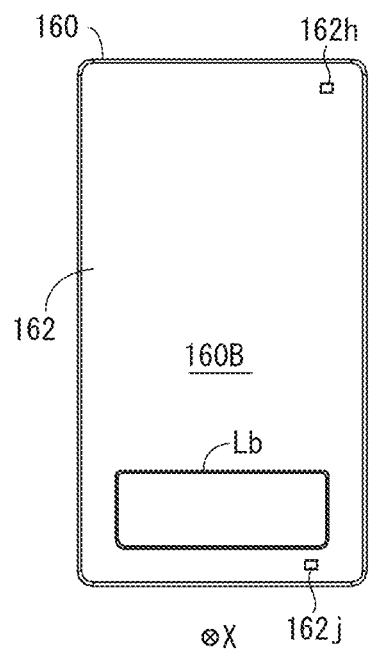
FIG. 8B is a rear view of the RFID reader according to the first embodiment.
Figure 8C:
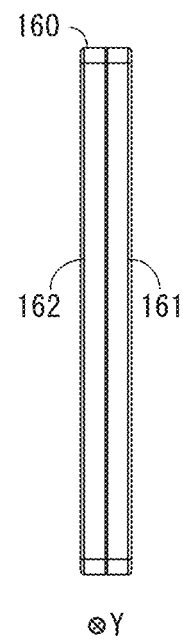
FIG. 8C is a left side view of the RFID reader according to the first embodiment.

The external I/F 104 is arranged at the lower end portion and near the center position Y0 in the right-left direction of the substrate 150. The connector of the external I/F 104 is exposed from a lower surface of the casing 160 (FIG. 8G). Therefore, the user may connect a charging cable to the external I/F 104 in a similar manner as in a smartphone, to thereby charge the RFID reader 100.

The battery 106 is arranged on an opposite side of the antenna portion 115 in the up-down direction, that is, on a lower side of the substrate 150, and also arranged on the opposite side of the RF communication portion 120 in the right-left direction, that is, on the left side of the substrate 150. A cutout portion 159, i.e., recess portion, having an inverted L shape is provided on the substrate 150 to form a space for accommodating the battery 106. Since the battery 106 is a component having a great thickness among the components of the RFID reader 100, it may be possible to reduce the thickness of the RFID reader 100 by providing the cutout portion 159 on the substrate 150. The details thereof will be described below with reference to FIG. 5.

Further, the battery 106 is a component having a great height, i.e., up-down direction length, and a great width, i.e., right-left direction length, among the components of the RFID reader 100. Since the battery 106 is arranged on the opposite side of the RF communication portion 120 in the right-left direction, it becomes possible to ensure a wide ground plane on the side having the active antenna element 115$f$, i.e., right side, and to enhance the antenna characteristics.

The power supply portion 107 and the charge portion 105 are arranged between the antenna portion 115 and the battery 106 in the up-down direction, and on the same side as the battery 106, i.e., the left side of the substrate 150, in the right-left direction. The power supply portion 107 is covered by a shield plate 154 so as to suppress radiation of switching noise of the DC-DC converter (FIG. 4). The shield plate 154 may be a tin plate, and mounted on the substrate 150 by soldering.

As described, according to the present embodiment, the antenna element, the communication circuit, the control portion, and the external communication portion are arranged in the name order from a first side toward a second side in the height direction at one side in the width direction on the substrate. Further, the parasitic antenna element, the power supply portion, and the battery are arranged in the named order from the first side toward the second side in the height direction at the other side in the width direction on the substrate. According to this arrangement, components may be arranged efficiently within the limited space in the casing while enhancing the antenna performance.

1.4. Arrangement of Components in Thickness Direction

Figure 6:
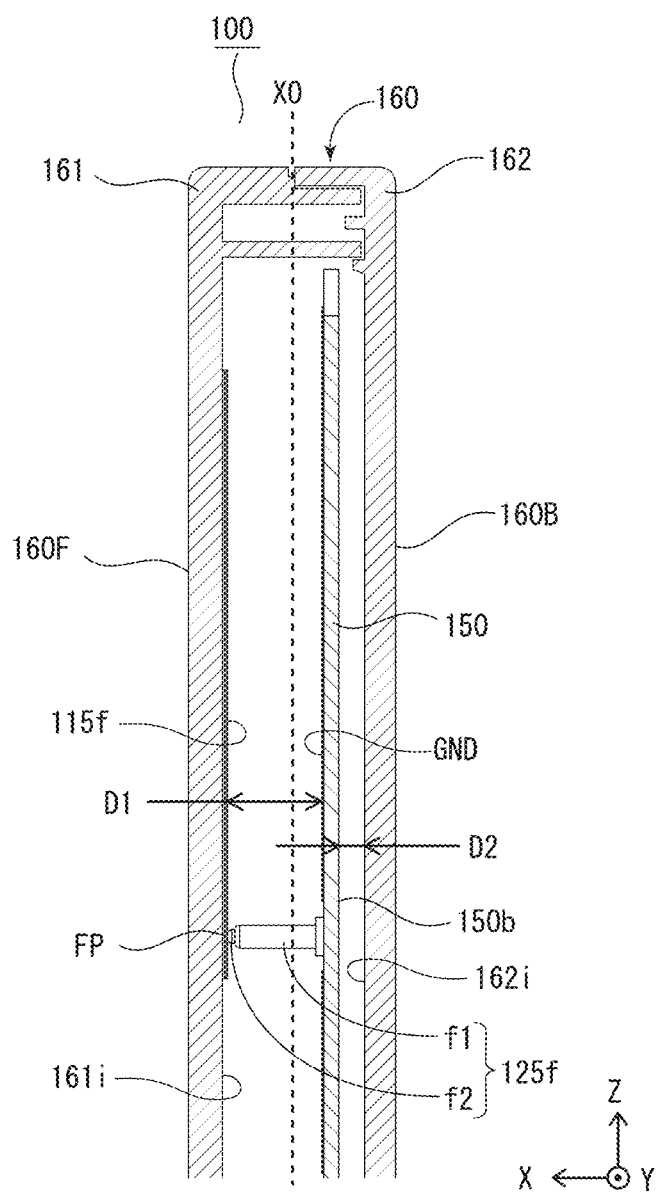
FIG. 6 is a cross-sectional view of the RFID reader according to the first embodiment.

Next, arrangement of components in the thickness direction, i.e., X-axis direction, of the RFID reader 100 will be described with reference to FIGS. 5 and 6. FIG. 6 is a cross-sectional view in which the RFID reader 100 is cut at a virtual plane perpendicular to the Y-axis direction.

As illustrated in FIGS. 4, 5, and 6, antenna elements 115$f$ and 115$p$ of the antenna portion 115 according to the present embodiment is arranged in a separated position from the substrate 150 on one side, i.e., front side or +X side, in the thickness direction, i.e., X-axis direction, of the RFID reader 100.

The antenna elements 115$f$ and 115$p$ and the substrate 150 are connected via contact pins 125$f$ and 125$p$ serving as connecting members. The contact pins 125$f$ and 125$p$ are mounted on the substrate 150 and protrude toward one side, i.e., front side or +X side, in the thickness direction, i.e., X-axis direction, of the substrate 150. Meanwhile, the antenna elements 115$f$ and 115$p$ are retained on a front cover 161 of the casing 160 described below, and when the substrate 150 is attached to the front cover 161, the antenna elements 115$f$ and 115$p$ respectively come into contact with the contact pins 125$f$ and 125$p$.

As illustrated in FIG. 6, a distance in the thickness direction, i.e., X-axis direction, from the position of contact, i.e., feed point FP, between the active antenna element 115$f$ and the contact pin 125$f$ to a ground plane GND on the substrate 150 is denoted as a first distance D1. Further, if the substrate 150 has multiple layers of ground planes, the distance from the feed point FP to a closest ground plane is denoted as the first distance D1. Further, a distance in the thickness direction, i.e., X-axis direction, from a rear surface 150$b$ of the substrate 150 to an inner surface 162$i$ of a rear surface portion 160B, i.e., first surface portion, of the casing 160 is denoted as a second distance D2. If the inner surface 162$i$ of the rear surface portion 160B has protrusions such as reinforcing ribs, the second distance D2 is defined based on the inner surface 162$i$ of the portion without the protrusions. In other words, the distance in the thickness direction from the feed point where the connecting member contacts the antenna element to the ground plane is referred to as a first distance, and the distance in the thickness direction from the substrate to the first surface portion is referred to as a second distance.

The present embodiment adopts a configuration in which the first distance D1 is greater than the second distance D2. In other words, the active antenna element 115$f$, the substrate 150, and the rear surface portion 160B are arranged to satisfy D1>D2.

According to one configuration example of the present embodiment, the first distance D1 is 6.2 mm, and the second distance D2 is 1.6 mm. The entire thickness of the casing 160 is approximately 13 mm. The entire thickness of the casing 160 is preferably 20 mm or less, and more preferably, within a range from 10 mm to 15 mm. Further, the height, i.e., up-down width, or height-direction dimension, and the width, i.e., right-left width, or width-direction dimension, of the casing 160 is not specifically limited, and from the viewpoint of usability, it is preferable for the size thereof to be set such that the user may carry the same in a pocket of his/her clothes.

Supposing that the antenna element is arranged on the substrate 150, the antenna element will be positioned close to the ground plane GND of the substrate 150. In that case, the electromagnetic wave radiated by the antenna element may be reduced and the antenna gain may be deteriorated.

According to the present embodiment, the antenna element 115$f$ is arranged at a position separated from the ground plane GND of the substrate 150 so as to satisfy D1>D2, such that the antenna gain may be improved. That is, according to the present embodiment, the antenna gain may be increased while suppressing the increase in size of the device in the thickness direction.

Further, the above-mentioned relationship of D1>D2 is also satisfied regarding the parasitic antenna element 115$p$. That is, the distance in the thickness direction from the position of contact between the parasitic antenna element 115$p$ and the contact pin 125$p$ to the ground plane GND on the substrate 150 is greater than the distance from the rear surface 150$b$ of the substrate 150 to the inner surface 162$i$ of a rear cover 162 of the casing 160.

The contact pins 125$f$ and 125$p$ are each preferably a spring pin-type contact, i.e., spring connector. The spring pin-type contact is a contact unit that is equipped with a cylindrical body portion f1, a contact portion f2 retained at a tip of the body portion, and a spring that urges the contact portion f2 in a direction in which the contact portion f2 protrudes from the body portion f1. In that case, when the contact pins 125$f$ and 125$p$ come into contact with the antenna elements 115$f$ and 115$p$, the contact portion f2 is pressed in against the urging force of the spring. By adopting the spring pin-type contact, it becomes possible to absorb the component tolerance and assembly tolerance of the casing 160 and the substrate 150, and to ensure conduction between the substrate 150 and the antenna elements 115$f$ and 115$p$ more reliably.

Further, it may also be possible to adopt a configuration in which a conductor having elasticity, such as a spring contact, comes into contact directly with the antenna element. Further, conduction may be ensured by having a portion of the antenna element come into slide contact with a portion of a contact member on the substrate side. That is, by adopting a configuration in which at least either one of a contact on the substrate side or a contact on the antenna element side is elastically deformable in the thickness direction, or by adopting a configuration in which the contact portions of each of the contacts are slidable, the conduction between the substrate 150 and the antenna elements 115$f$ and 115$p$ may be ensured more reliably.

1.5. Antenna Characteristics

Radiation characteristics of the antenna portion 115 according to the present embodiment will be described with reference to FIG. 7. Measurement of radiation patterns illustrated in FIG. 7 was performed using a so-called standard antenna method. In the standard antenna method, the antenna gain, i.e., relative gain, of a measurement target, which according to the present embodiment is the RFID reader 100, is measured by comparison with an antenna, i.e., standard antenna or reference antenna, whose gain is known in advance.

As a measurement environment, a radio wave darkroom, or a radio wave dark box, equipped with a turntable is used. As a standard antenna, a horn antenna is used, for example. As an example, in the measurement illustrated in FIG. 7, a measurement system having combined a hexahedron radio wave darkroom, a horn antenna, a spectrum analyzer ESW26, which is a product of ROHDE & SCHWARZ, and a signal generator N5171B, which is a product of Keysight Technologies, was used. The measurement equipment used for the measurement illustrated in FIG. 7 may be any equipment capable of performing an equivalent measurement, and it is not limited to the abovementioned equipment.

As a measurement procedure, at first, a standard antenna and a receiving antenna are placed in a radio wave darkroom, wherein the standard antenna is caused to output an electromagnetic wave of the same frequency as the frequency used for communication by the RFID reader 100, and the receiving antenna is used to measure an electric field intensity E0. Next, the RFID reader 100 is placed instead of the standard antenna at a same position as where the standard antenna has been placed, and the RFID reader 100 is caused to radiate the electromagnetic wave and the receiving antenna is used to measure an electric field intensity E. If the standard antenna gain is denoted by G0, a gain G (dB) of the RFID reader 100 may be represented by G=G0+E−E0. In order to acquire a radiation pattern, the values of gain measured while turning the turntable may be plotted on a circular graph. Further, by using an antenna for a horizontally polarized wave or a vertically polarized wave as the receiving antenna, the linearly-polarized-wave component of the electromagnetic wave radiated by the RFID reader 100 may be measured.

Figure 7:
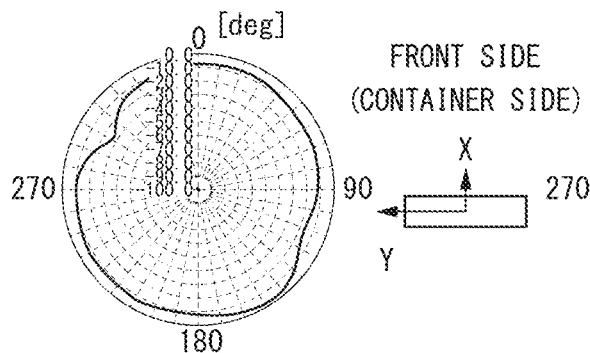
FIG. 7 is a view illustrating radiation characteristics of electromagnetic waves of the RFID reader according to the first embodiment.
Figure 7:
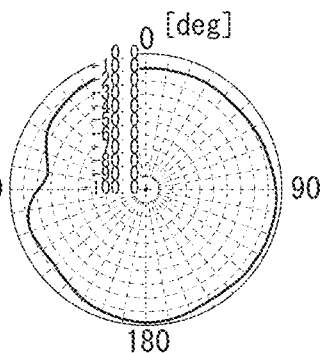
Figure 7:
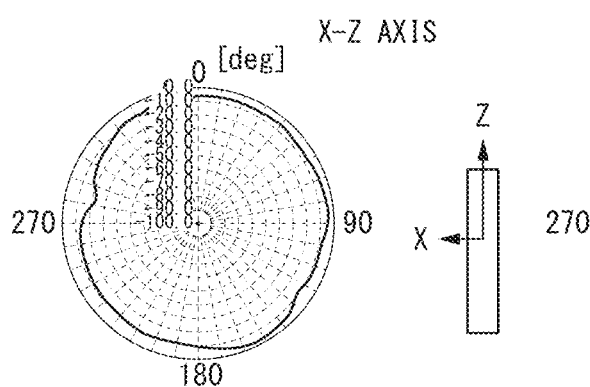
Figure 7:
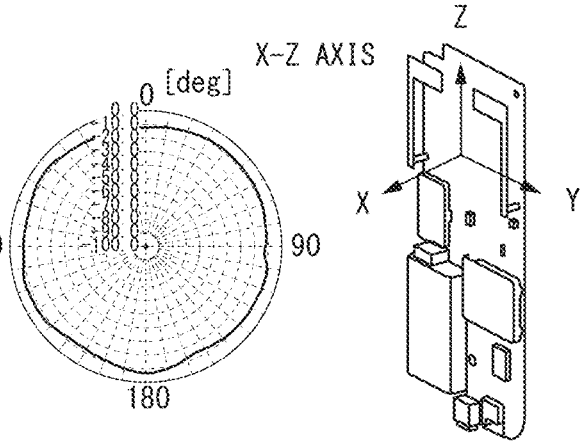
Figure 7:
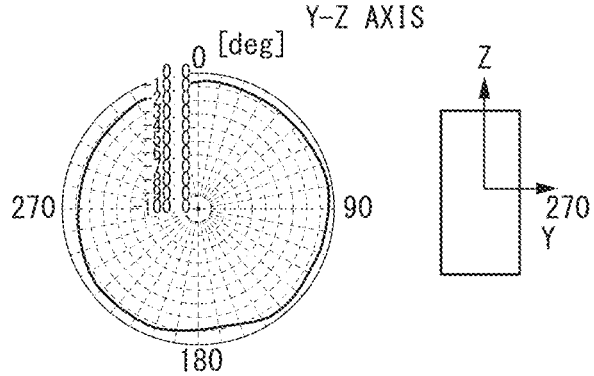
Figure 7:
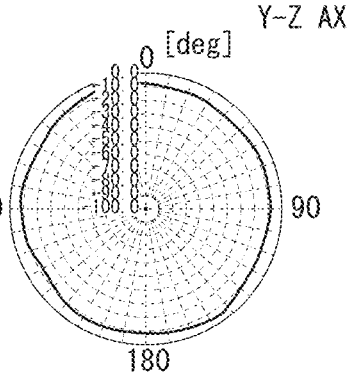

An upper stage of FIG. 7 illustrates a horizontally-polarized-wave gain (left) and a vertically-polarized-wave gain (right) of the RFID reader 100 on a plane, i.e., XY plane, perpendicular to the Z axis. An intermediate stage of FIG. 7 illustrates a horizontally-polarized-wave gain (left) and a vertically-polarized-wave gain (right) of the RFID reader 100 on a plane, i.e., XZ plane, perpendicular to the Y axis. A lower stage of FIG. 7 illustrates a horizontally-polarized-wave gain (left) and a vertically-polarized-wave gain (right) of the RFID reader 100 on a plane, i.e., YZ plane, perpendicular to the X axis.

As illustrated in the respective drawings of FIG. 7, the antenna portion 115 according to the present embodiment has an approximately same level of gain to all directions of a spherical surface. Specifically, regarding each of the horizontally polarized wave and the vertically polarized wave, a difference between a maximum gain and a minimum gain in each of the XY plane, the XZ plane, and the YZ plane is 30 dB or less. Therefore, a stable communication may be realized regardless of the position of the RFID tag 200 when the RFID reader 100 is set as the center of the coordinate axis, or the relative position of the antenna element of the RFID tag 200 with respect to the RFID reader 100. Therefore, even in a case where the user moves around carrying the RFID reader 100, or in a case where the RFID tag 200 is attached to a moving target, the RFID reader 100 may detect the RFID tag 200 more reliably.

The radiation characteristics of the RFID reader 100 may be varied according to the purpose of use of the RFID reader 100 and the configuration of the RFID system. For example, if the position of the RFID tag 200 is limited, it may be possible to provide the antenna portion with an all-directional property described above for either one of the horizontally polarized wave or the vertically polarized wave. Further, if it is known that a shielding object is constantly present at a predetermined direction with respect to the RFID reader 100 based on the purpose of use of the RFID reader 100, the antenna portion may have a directivity in which the above-mentioned direction is set as a null point.

1.6. Casing Configuration

Next, a casing configuration of the RFID reader 100 will be described with reference to FIGS. 8A to 13B.

Figure 10:
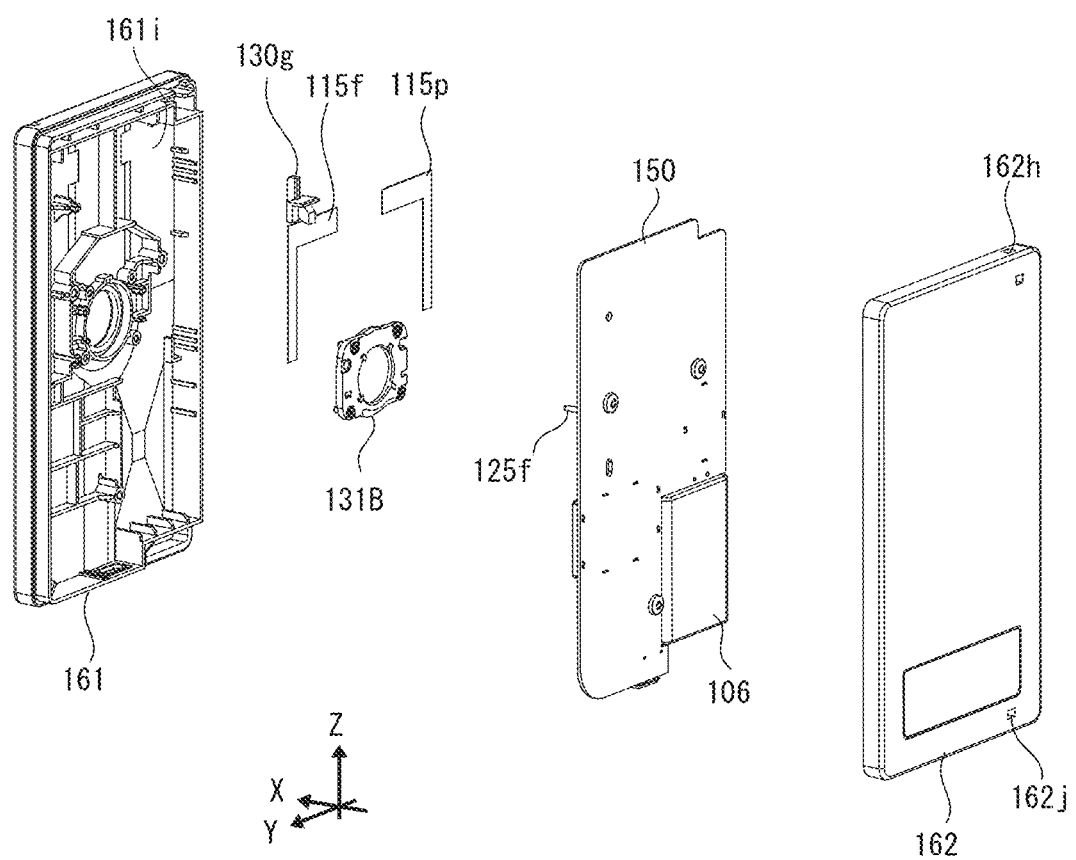
FIG. 10 is an exploded view of the RFID reader according to the first embodiment.
Figure 11A:
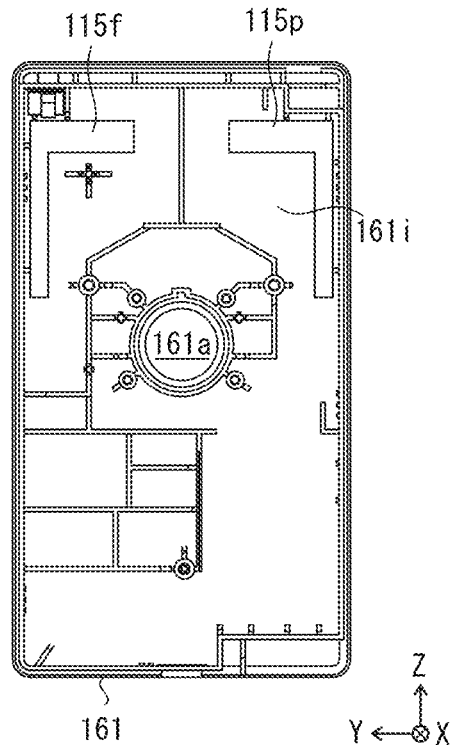
FIG. 11A is a view illustrating a positional relationship between a front cover and components according to the first embodiment.
Figure 11B:
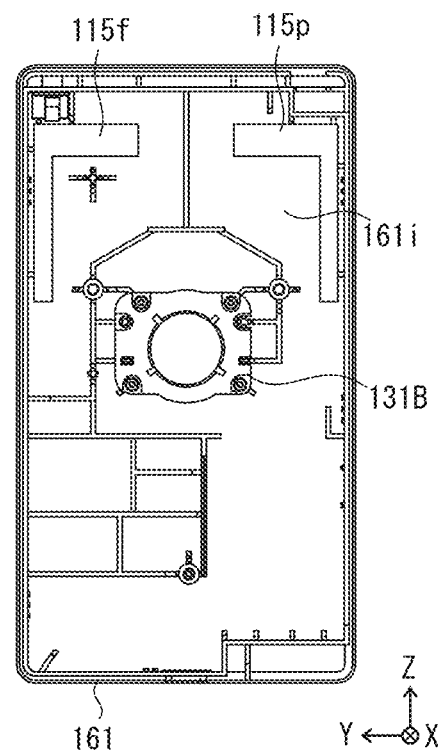
FIG. 11B is a view illustrating a positional relationship between the front cover and the components according to the first embodiment.
Figure 12A:
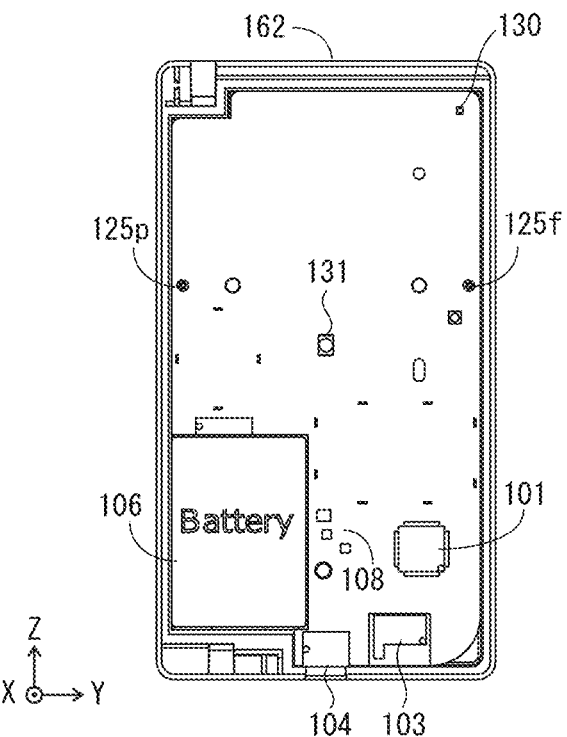
FIG. 12A is a view illustrating a positional relationship between a rear cover and components according to the first embodiment.
Figure 12B:
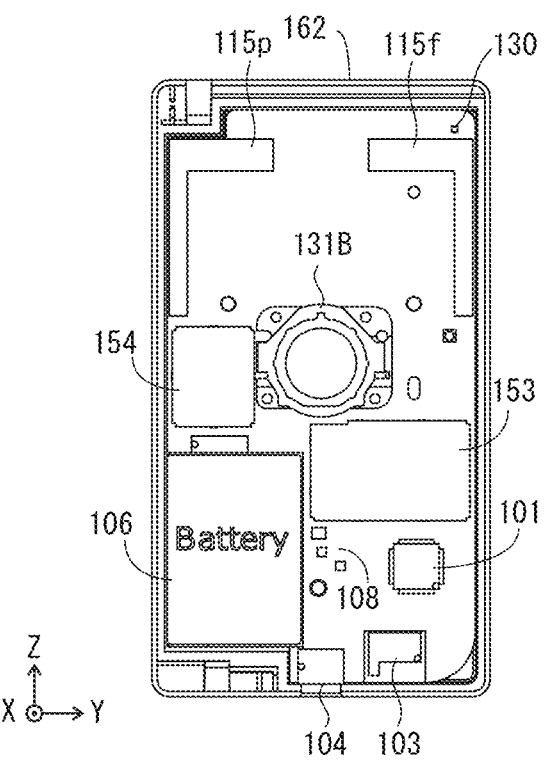
FIG. 12B is a view illustrating a positional relationship between the rear cover and the components according to the first embodiment.
Figure 13A:
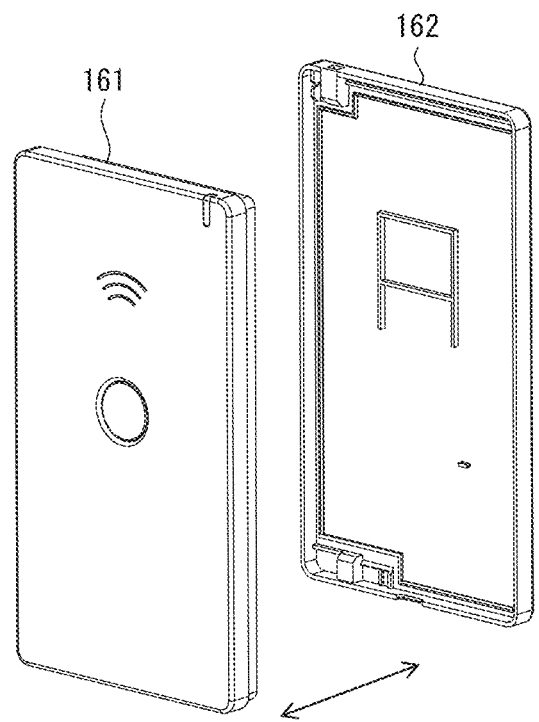
FIG. 13A is a view illustrating a method for joining the front cover and the rear cover according to the first embodiment.
Figure 13B:
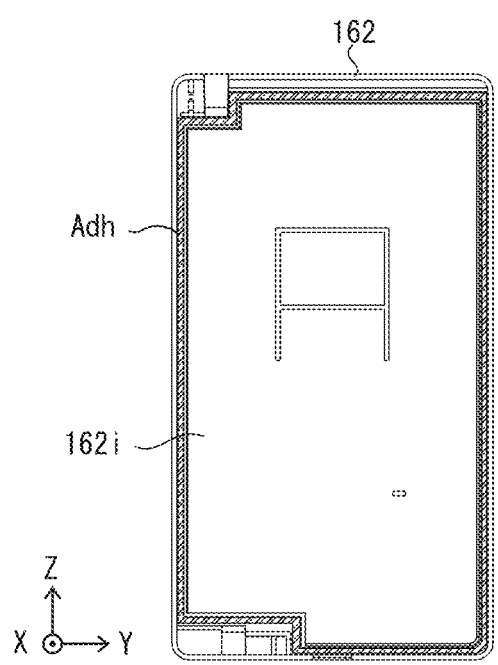
FIG. 13B is a view illustrating a method for joining the front cover and the rear cover according to the first embodiment.

FIGS. 8A to 8G are each a top view (FIG. 8A), a rear view (FIG. 8B), a left side view (FIG. 8C), a front view (FIG. 8D), a right side view (FIG. 8E), a cross-sectional view (FIG. 8F), and a bottom view (FIG. 8G) of the RFID reader 100 according to the first embodiment. FIGS. 9 and 10 are each an exploded view of the RFID reader 100. FIG. 11A is a view in which the front cover 161 of the casing 160 to which the antenna elements 115f and 115p and the light guide 130g are attached is viewed from the rear side, i.e., −X side. FIG. 11B is a view in which the front cover 161 of the casing 160 to which a button assembly 131B is further added to the state of FIG. 11A is viewed from the rear side, i.e., −X side. FIG. 12A is a view in which the substrate 150, the battery 106, and the rear cover 162 are illustrated from the front side, i.e., +X side. FIG. 12B is a view in which the antenna portion 115, the button assembly 131B, and the shield plates 153 and 154 are added further to FIG. 12A. FIGS. 13A and 13B are each an explanatory view illustrating a method for joining the front cover 161 and the rear cover 162.

As illustrated in FIGS. 8A to 8G, 9, and 10, the casing 160 of the RFID reader 100 according to the present embodiment is composed of two members, which are the front cover 161 and the rear cover 162. The front cover 161 is a member having an approximately rectangular shape that covers the substrate 150 when viewed from the front side, i.e., +X side, in the thickness direction, and constitutes the front side portion 160F of the casing 160. The rear cover 162 is a member having an approximately rectangular shape that covers the substrate 150 when viewed from the rear side, i.e., −X side, in the thickness direction, and constitutes the rear surface portion 160B of the casing 160.

The front cover 161 and the rear cover 162 are formed of a resin material through which the electromagnetic wave radiated by the antenna portion 115 is transmitted. Further, since the dielectric constant and dielectric loss tangent of the material of the casing 160 influences the radio wave characteristics, it is preferable to optimize the shape of the antenna portion 115 according to the material of the front cover 161 and the rear cover 162.

Figure 8D:
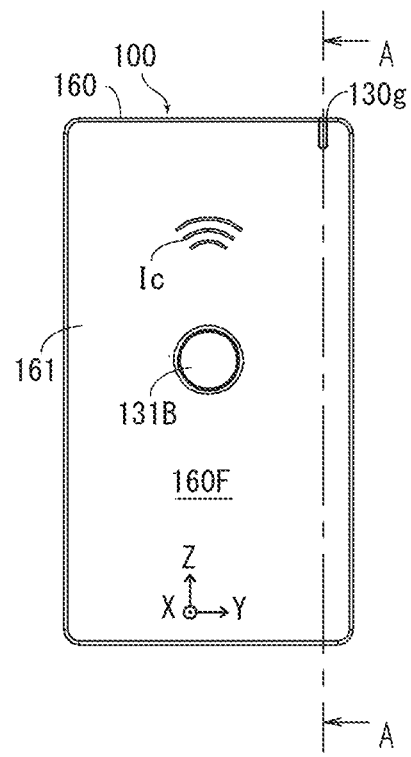
FIG. 8D is a front view of the RFID reader according to the first embodiment.
Figure 8E:
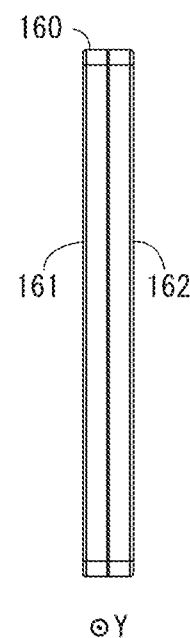
FIG. 8E is a right side view of the RFID reader according to the first embodiment.
Figure 8F:
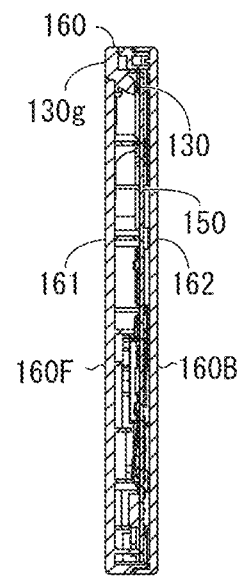
FIG. 8F is a cross-sectional view of the RFID reader according to the first embodiment.
Figure 8G:
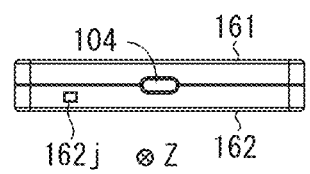
FIG. 8G is a bottom view of the RFID reader according to the first embodiment.
Figure 9:
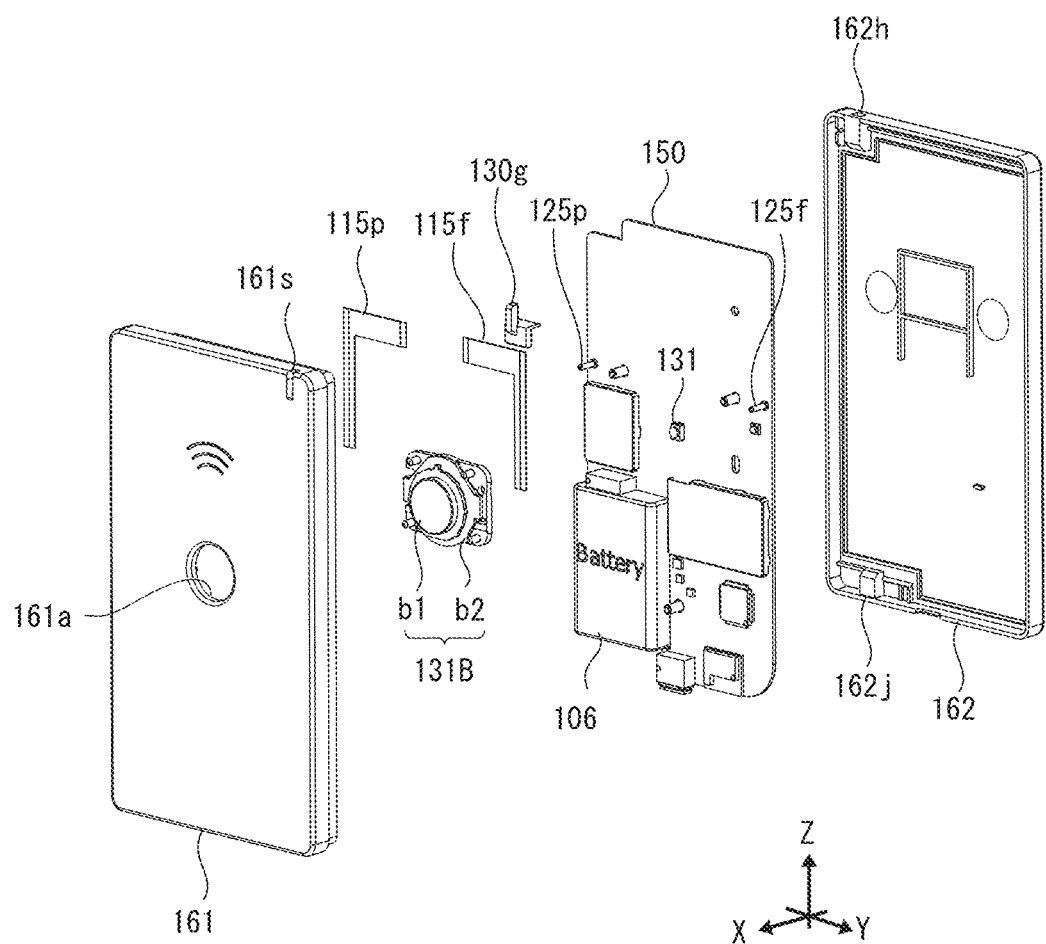
FIG. 9 is an exploded view of the RFID reader according to the first embodiment.

A slit 161s on which the light guide 130g for the LED 130 is to be attached is disposed on the edge portion on the front side and upper side of the front cover 161 (refer to FIGS. 8D, 8F, and 9). The light guide 130g is a component that guides the light emitted from the LED 130 to a light-emitting surface exposed on the outer portion of the casing 160. The light guide 130g is bonded to the front cover 161 in a state fit to the slit 161s.

The button assembly 131B is fixed from a rear side to the front cover 161 by a method such as screw fastening (refer to FIGS. 8D, 10, 11A, and 11B). The button assembly 131B includes a cap portion b1 exposed to the exterior of the casing 160 via a window portion 161a (FIG. 10) disposed on the front cover 161, and a seat b2 that supports the cap portion elastically. When the user presses the cap portion b1, the switch 131 (FIG. 9) of the substrate 150 is pressed down by the cap portion b1.

An antenna icon Ic is provided at a center portion in the right-left direction of the front side portion 160F of the front cover 161 and above the button assembly 131B (refer to FIG. 8D). The antenna icon Ic functions to allow the RFID reader 100 to be easily noticed at a glance as an equipment that radiates electromagnetic waves, and to prevent the user from holding the antenna portion 115 and blocking the electromagnetic wave. The antenna icon Ic may be indicated by a concave-convex shape formed on the front side portion 160F of the front cover 161.

Strap holes 162h and 162j are provided at two locations, the upper portion and the lower portion, of the rear cover 162 (FIGS. 8A, 8B, and 8G). The user may attach neck straps and arm straps to the strap holes 162h and 162j as needed.

Further, a label Lb is attached to the rear surface portion 160B of the rear cover 162. The label Lb is a rating plate that complies with regulations, and includes information such as a serial number and a construction certification.

As illustrated in FIGS. 10A, 10B, and 6, the antenna elements 115f and 115p according to the present embodiment are retained on an inner surface 161i, i.e., surface on an inner side of the casing, of the front cover 161 constituting the front side portion 160F, i.e., second surface portion, of the casing 160. If the substrate 150 is fixed, for example by screw fastening, to the front cover 161 in this state, the tips of the contact pins 125f and 125p on the substrate 150 side come into contact with the antenna elements 115f and 115p, by which the substrate 150 is conducted with the antenna portion 115 (refer to FIGS. 12A and 12B).

As illustrated in FIGS. 13A and 13B, the front cover 161 and the rear cover 162 are mutually joined in a state where the substrate 150 and other components are interposed therein. For example, an adhesive is applied to an outer circumference area Adh (oblique line portion) illustrated in FIG. 13B, and the front cover 161 and the rear cover 162 are bonded. Thereby, the casing 160 is configured so as not to be easily disassembled.

As illustrated in FIGS. 6 and 8F, according to the present embodiment, the antenna elements 115f and 115p and the substrate 150 are retained within the space between the front cover 161 and the rear cover 162 in a state after having assembled the RFID reader 100. The substrate 150 is fixed to the front cover 161 by methods such as screw fastening, such that the possibility of damages caused by the impact of falling may be reduced.

In the present embodiment, the main components on the substrate 150 are collectively arranged on the same side of the substrate 150 and on a side at which the substrate 150 faces the antenna element, i.e., front side or +X side, in order to ensure the distance between the antenna elements 115f and 115p and the ground plane GND on the substrate 150. Specifically, the calculation unit 101, the storage portion 102, the data communication portion 103, the external I/F 104, the charge portion 105, the power supply portion 107, i.e., the shield plate 154, the LED 130, the switch 131, and the RF communication portion 120, i.e., the shield plate 153, are all arranged on the front side of the substrate 150. The front side surface of the substrate 150 is offset to a rear side, i.e., −X side, from a center position X0 of the casing 160 in the thickness direction, i.e., X-axis direction (FIG. 6). According to this configuration, the distance between the antenna elements 115f and 115p and the ground plane GND on the substrate 150 may be ensured while suppressing the increase in size in the thickness direction of the casing 160, and the antenna gain may be improved.

Further according to the present embodiment, the battery 106 is a component having the greatest thickness-direction dimension among the components of the RFID reader 100 excluding the casing 160. If the battery 106 has a large capacity, the charging frequency of the RFID reader 100 may be reduced, and the usability may be improved. According to the present embodiment, the substrate 150 is provided with the cutout portion 159 (FIG. 3) that corresponds to the shape of the battery 106, such that the substrate 150 may be arranged in a state where the occupation range in the thickness direction of the battery 106 and the occupation range in the thickness direction of the substrate 150 are overlapped (FIG. 5).

In other words, when viewed in any of the directions orthogonal to the thickness direction, the substrate 150 and the battery 106 overlap. Thereby, the casing 160 may be downsized in the thickness direction compared to a configuration where the substrate 150 and the battery 106 are arranged side by side in the thickness direction. The thickness, i.e., maximum thickness, of the battery 106 is greater than the first distance D1 and smaller than the sum of the first distance D1 and the second distance D2.

2. Second Embodiment

An RFID reader 100A according to a second embodiment will be described with reference to FIG. 14. Hereafter, elements having substantially the same configurations and functions as those of the first embodiment are denoted with the same reference numbers as the first embodiment, and mainly the portions that differ from the first embodiment will be described.

Figure 14:
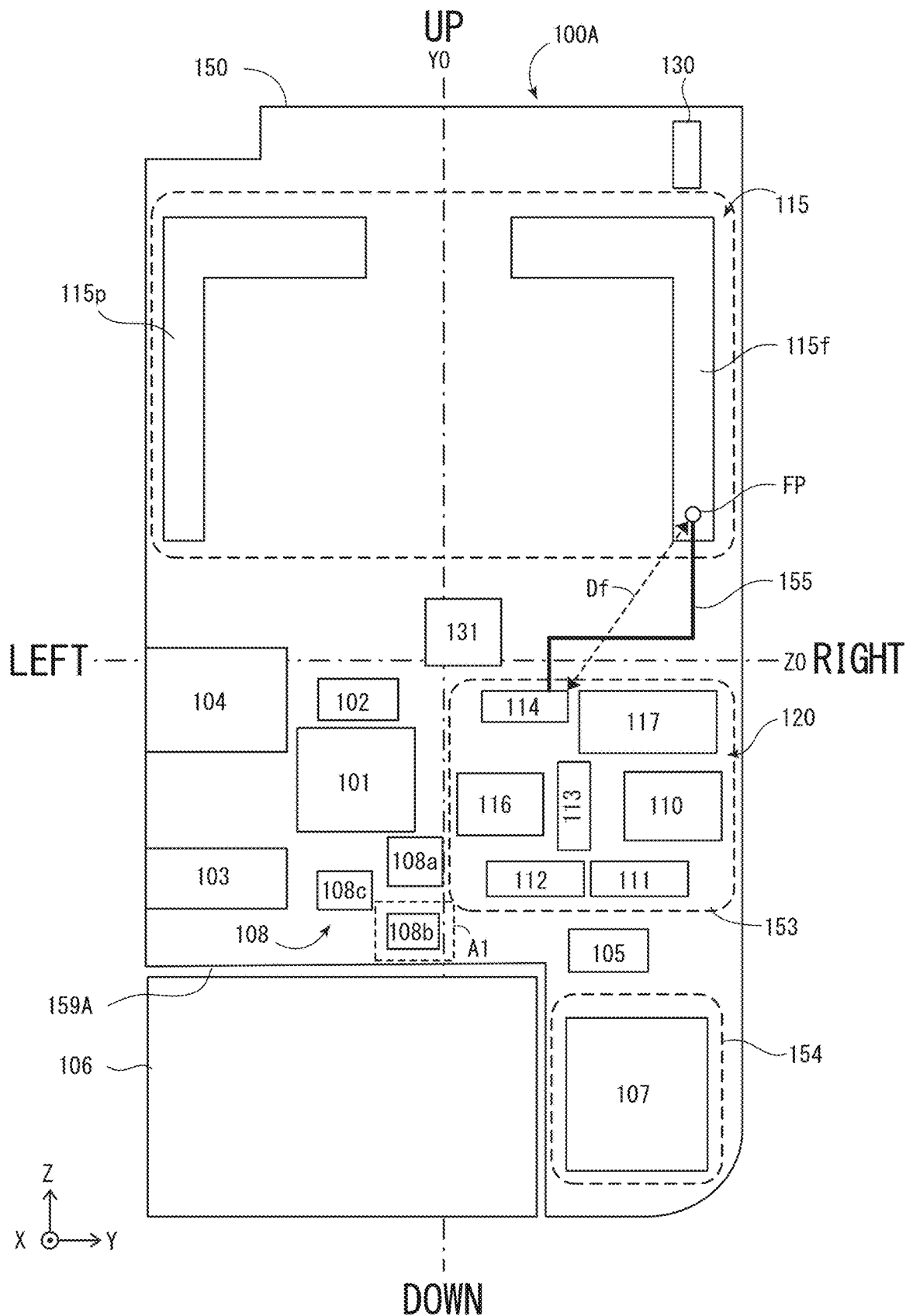
FIG. 14 is an arrangement plan view illustrating the arrangement of main components of an RFID reader according to a second embodiment.

FIG. 14 is an arrangement plan view illustrating an arrangement of components on the substrate 150 according to the second embodiment. FIG. 14 illustrates a state of the substrate 150 viewed from a front side, i.e., +X side, in the thickness direction of the RFID reader 100A. Components of the RFID reader 100A according to the present embodiment are similar to those of the first embodiment illustrated in FIG. 1, but arrangements of the components on the substrate 150 differ.

As illustrated in FIG. 14, the battery 106 is arranged laterally in a cutout portion 159A formed at a lower portion of the substrate 150, and the power supply portion 107 is arranged on the right side of the battery 106 and at the lower portion of the substrate 150. The power supply portion 107 is covered with the shield plate 154. Further, the charge portion 105 is arranged adjacently to the upper side of the battery 106. As described, by arranging components related to the power supply collectively on the lower portion of the substrate 150, the wiring efficiency may be enhanced, and the possibility of noise generated from the power supply portion 107 interfering with the transmission and reception of electromagnetic waves via the antenna portion 115 may be reduced.

The RF communication portion 120 is arranged on the lower side of the antenna portion 115 and on the upper side of the power supply portion 107, on the right side of the substrate 150. The RF communication portion 120 is covered by the shield plate 153. The side on which the RF communication portion 120 is arranged with respect to the right-left direction is the same as the side, i.e., right side or +Y side, on which the active antenna element 115$f$ that receives power supply from the RF communication portion 120 is arranged. Therefore, the loss of transmission signals or reception signals on the feed line 155 that extends from the RF communication portion 120 to the feed point FP of the active antenna element 115$f$ may be reduced.

Similarly according to the present embodiment, the feed distance Df between the feed point FP of the active antenna element 115$f$ and the second coupler 114 of the RF communication portion 120 is shorter than any of the distances from the feed point FP to the calculation unit 101, to the data communication portion 103, and to the power supply portion. Therefore, the possibility of electromagnetic wave, or noise, generated from these components interfering with the transmission and reception of signals via the feed line 155 may be reduced.

The external I/F 104 and the data communication portion 103 are arranged on a left end portion of the substrate 150. Regarding the up-down direction, the data communication portion 103 is arranged on an opposite side, i.e., lower side, of the antenna portion 115 interposing the external I/F 104. Therefore, the possibility of electromagnetic waves generated when the data communication portion 103 communicates interfering with the transmission and reception of signals via the antenna portion 115 may be reduced.

The calculation unit 101 and the storage portion 102 are arranged between the external I/F and data communication portion 103 and the RF communication portion 120 in the right-left direction. Regarding the up-down direction, the calculation unit 101 is arranged on an opposite side, i.e., lower side of the antenna portion 115 interposing the storage portion 102. Therefore, the possibility of electromagnetic wave noise being generated from the calculation unit 101 interfering with the transmission and reception of signals via the antenna portion 115 may be reduced.

As described, according to the present embodiment, the antenna element, the communication circuit, and the power supply portion are arranged in the named order from a first side toward a second side in the height direction at one side in the width direction on the substrate. Further, the parasitic antenna element, the external communication portion, and the battery are arranged in the named order from the first side toward the second side in the height direction at the other side in the width direction on the substrate. According to this arrangement, components may be arranged efficiently in the limited space within the casing while enhancing the antenna performance.

Similarly according to the present embodiment, the antenna elements 115$f$ and 115$p$ are arranged at a position separated from the ground plane GND on the substrate 150, and D1>D2 is satisfied. Thereby, the antenna gain may be enhanced while suppressing the increase in size of the device in the thickness direction. According further to the present embodiment, the antenna portion 115 and the circuits on the substrate 150 may be arranged efficiently in a limited space within the casing 160 according to a layout that differs from the first embodiment.

3. Third Embodiment

An RFID reader 100B according to a third embodiment will be described with reference to FIGS. 15A, 15B, 16A and 16B. Hereafter, elements having substantially the same configurations and functions as those of the first embodiment are denoted with the same reference numbers as the first embodiment, and mainly the portions that differ from the first embodiment will be described.

Figure 15A:
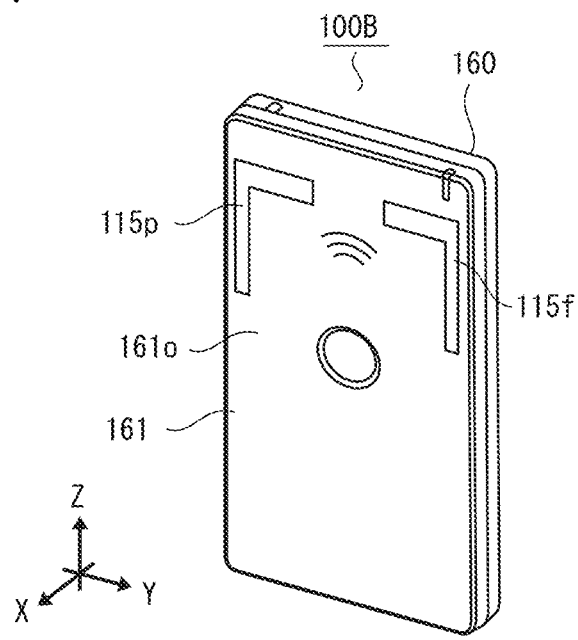
FIG. 15A is a perspective view of an RFID reader according to a third embodiment.
Figure 15B:
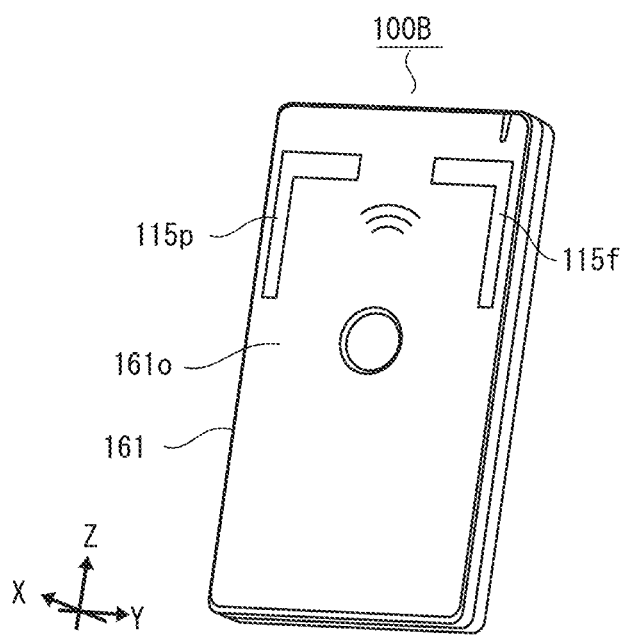
FIG. 15B is a perspective view of the RFID reader according to the third embodiment.
Figure 16A:
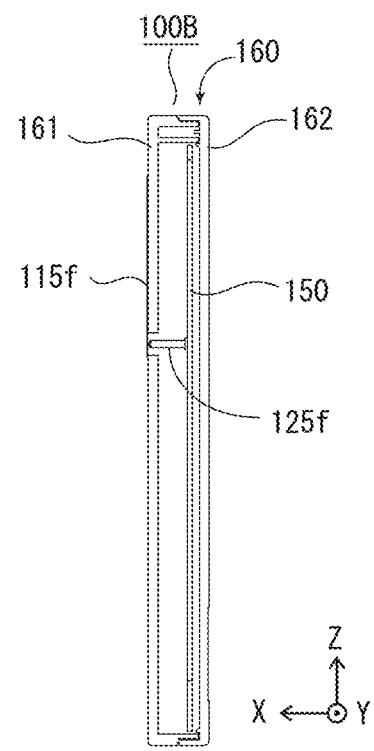
FIG. 16A is a cross-sectional view of the RFID reader according to the third embodiment.
Figure 16B:
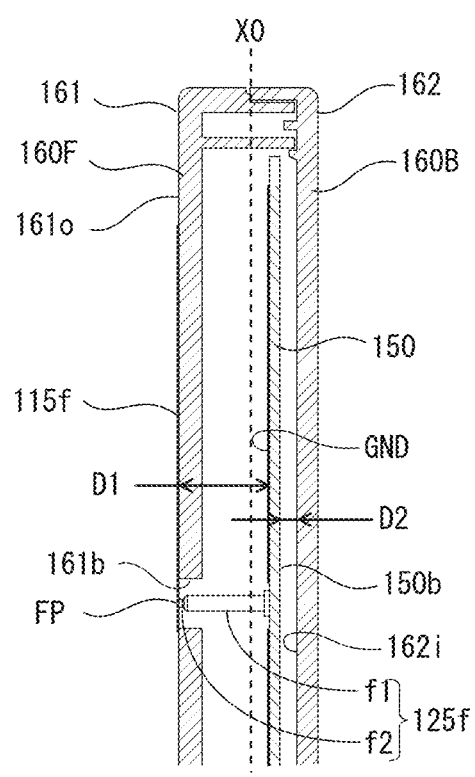
FIG. 16B is an enlarged view of the RFID reader according to the third embodiment.

FIGS. 15A and 15B are a perspective view of the RFID reader 100B according to the third embodiment. FIG. 16A is a cross-sectional view of the RFID reader 100B of a plane perpendicular to the Y-axis direction, and FIG. 16B is an enlarged view having enlarged a portion thereof.

As illustrated in FIGS. 15A, 15B, 16A, and 16B, according to the present embodiment, the antenna elements 115$f$ and 115$p$ of the antenna portion 115 are arranged on an outer side of the casing 160. The antenna elements 115$f$ and 115$p$ are fixed, for example by a double-sided tape, to an outer surface 1610, i.e., surface on the outer side of the casing, of the front cover 161 that constitutes the front side portion 160F, i.e., second surface portion, of the casing 160.

A hole 161$b$ (FIG. 16B) that is passed through in the thickness direction, i.e., X-axis direction, is formed on the front cover 161. The contact pin 125$f$ that serves as a connecting member disposed on the substrate 150 comes into contact with the antenna element 115$f$ through the hole on the front cover 161. FIGS. 16A and 16B illustrate a contact configuration of the active antenna element 115$f$, but the contact configuration of the parasitic antenna element 115$p$ adopts a similar configuration.

Similarly according to the present embodiment, the antenna elements 115*f* and 115*p* are arranged at a position separated from the ground plane GND on the substrate 150, and D1>D2 is satisfied. Thereby, the antenna gain may be enhanced while suppressing the increase in size of the device in the thickness direction.

Further according to the present embodiment, the first distance D1 may be made greater than the first embodiment without increasing the entire thickness of the casing 160. That is, compared to the first embodiment (FIG. 6), the first distance D1 may be made great corresponding to the thickness of the front cover 161. Thereby, if the entire thickness of the casing 160 is fixed, the antenna gain may be further improved by ensuring the first distance D1. Further, the casing 160 may be thinned while maintaining the antenna gain.

In the present embodiment, the antenna elements 115*f* and 115*p* may be covered with a resin film having a thickness of a few tens to a few hundred μm, so as to protect the antenna elements 115*f* and 115*p* positioned outside the casing 160 from corrosion or damage. Further, the antenna elements 115*f* and 115*p* may be covered with an opaque resin film to improve the appearance thereof. Even if the antenna elements 115*f* and 115*p* are covered with an extremely thin resin film, the radiation characteristics of the antenna portion 115 may approximately be maintained.

As explained above, the present disclosure provides a reading device capable of realizing a high gain of an antenna while suppressing increase in size of the device in a thickness direction.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A reading device comprising:
an antenna element;
a substrate including a communication circuit configured to perform transmission and reception of radio signals with an RFID tag via the antenna element, and a ground plane configured to provide a reference potential of the antenna element;
a connecting member protruding from the substrate in a thickness direction of the substrate and configured to electrically connect the communication circuit and the antenna element; and
a casing configured to retain the antenna element, the substrate, and the connecting member, the casing having a plate-like outer shape whose dimension in the thickness direction is smaller than dimensions in a height direction and a width direction when viewed in the thickness direction,
wherein the antenna element is arranged separately from the substrate toward one side in the thickness direction,
wherein the casing includes a first surface portion that covers the substrate when viewed from the other side in the thickness direction, and
wherein in a case where a distance in the thickness direction from a feed point at which the connecting member comes into contact with the antenna element to the ground plane is a first distance, and a distance in the thickness direction between the substrate and the first surface portion is a second distance, the first distance is greater than the second distance,
wherein the casing includes a second surface portion that covers the substrate when viewed from the one side in the thickness direction, and
wherein the antenna element is supported either (i) on a surface of the second surface portion at an inner side of the casing, or (ii) on a surface of the second surface portion at an outer side of the casing.

2. The reading device according to claim 1, wherein the reading device is configured to radiate an electromagnetic wave into a reading range, and to read information returned from the RFID tag using an energy of the electromagnetic wave.

3. The reading device according to claim 1,
wherein the antenna element is supported on the surface of the second surface portion at the inner side of the casing.

4. The reading device according to claim 1,
wherein the antenna element is supported on the surface of the second surface portion at the outer side of the casing.

5. The reading device according to claim 1, further comprising:
an external communication portion configured to perform wireless communication with a target that differs from a target of wireless communication performed via the antenna element;
a control portion configured to control the communication circuit and the external communication portion;
a battery; and
a power supply portion configured to supply a power of the battery to the communication circuit, the external communication portion, and the control portion.

6. The reading device according to claim 5, wherein a distance between the feed point and the communication circuit on the substrate is shorter than any of a distance between the feed point and the control portion, a distance between the feed point and the external communication portion, and a distance between the feed point and the power supply portion.

7. The reading device according to claim 5,
wherein the communication circuit, the external communication portion, the control portion, and the power supply portion are arranged collectively on a surface of the substrate at which the substrate faces the antenna element, and
wherein the surface of the substrate that faces the antenna element is offset toward the other side in the thickness direction from a center position of the casing in the thickness direction.

8. The reading device according to claim 5, further comprising:
a parasitic antenna element that does not receive feeding of power from the communication circuit,
wherein the antenna element and the parasitic antenna element are arranged in parallel in the width direction, and
wherein the communication circuit is arranged on a same side as the antenna element with respect to the width direction.

9. The reading device according to claim 8, wherein the communication circuit, the external communication portion, the control portion, the power supply portion, and the battery are arranged collectively on one side in the height direction with respect to the antenna element and the parasitic antenna element.

10. The reading device according to claim 9,
wherein the casing has a rectangular shape whose dimension in the height direction is greater than a dimension in the width direction when viewed in the thickness direction, and
wherein the antenna element, the communication circuit, the control portion, and the external communication portion are arranged in the named order from a first side to a second side in the height direction at one side in the width direction on the substrate, and the parasitic antenna element, the power supply portion, and the battery are arranged in the named order from the first side to the second side in the height direction at the other side in the width direction on the substrate.

11. The reading device according to claim 9,
wherein the casing has a rectangular shape whose dimension in the height direction is greater than a dimension in the width direction when viewed in the thickness direction, and
wherein the antenna element, the communication circuit, and the power supply portion are arranged in the named order from a first side to a second side in the height direction at one side in the width direction on the substrate, and the parasitic antenna element, the external communication portion, and the battery are arranged in the named order from the first side to the second side in the height direction at the other side in the width direction on the substrate.

12. The reading device according to claim 5,
wherein the substrate includes a recess portion accommodating at least a portion of the battery when viewed in the thickness direction, and
wherein the battery and the substrate overlap when viewed in a direction orthogonal to the thickness direction.

13. The reading device according to claim 5, wherein the connecting member includes a body portion having a cylindrical shape, a contact portion that is supported at a tip of the body portion, and a spring configured to urge the contact portion in a direction in which the contact portion protrudes from the body portion.

14. The reading device according to claim 5, further comprising:
a measurement portion disposed on the substrate and configured to measure information of a moving amount of the reading device or information of an environment in which the reading device is placed,
wherein a distance between the feed point and the communication circuit on the substrate is shorter than a distance between the feed point and the measurement portion.

* * * * *